(12) United States Patent
Chen et al.

(10) Patent No.: US 10,778,376 B2
(45) Date of Patent: *Sep. 15, 2020

(54) CARRIER AGGREGATION WITH DYNAMIC TDD DL/UL SUBFRAME CONFIGURATION

(71) Applicant: QUALCOMM Incorporated, San Diego, CA (US)

(72) Inventors: Wanshi Chen, San Diego, CA (US); Jelena Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,615

(22) Filed: Dec. 10, 2018

(65) Prior Publication Data

US 2019/0109675 A1    Apr. 11, 2019

Related U.S. Application Data

(63) Continuation of application No. 14/607,455, filed on Jan. 28, 2015, now Pat. No. 10,153,867.

(Continued)

(51) Int. Cl.
*H04W 72/04* (2009.01)
*H04L 1/18* (2006.01)
(Continued)

(52) U.S. Cl.
CPC .......... *H04L 1/1812* (2013.01); *H04L 1/1854* (2013.01); *H04L 5/0055* (2013.01);
(Continued)

(58) Field of Classification Search
CPC ... H04L 1/1812; H04L 1/1854; H04L 5/0055; H04W 24/10; H04W 56/0015; H04W 72/042; H04W 72/0446; H04W 88/06
See application file for complete search history.

(56) References Cited

U.S. PATENT DOCUMENTS 10,143,867 B2    12/2018 Su et al.
10,153,867 B2    12/2018 Chen et al.
(Continued)

FOREIGN PATENT DOCUMENTS

| CN | 102255718 A | 11/2011 |
| CN | 103378957 A | 10/2013 |
| WO | WO-2014013668 A1 | 1/2014 |

OTHER PUBLICATIONS

3GPP: "Samsung on PDSCH HARQ transmission" 3GPP TSG RAN WG1 #74 R1-133095, pp. 1-4, Aug. 10, 2013(Aug. 10, 2013).

(Continued)

*Primary Examiner* — Mehmood B. Khan
*Assistant Examiner* — Zhaohui Yang
(74) *Attorney, Agent, or Firm* — Holland & Hart LLP

(57) ABSTRACT

A user equipment (UE) communicating in a carrier aggregation (CA) or multi-connectivity operation using more than one component carrier (CC), where at least one of the CCs is enabled to use evolved interference management for traffic adaptation (eIMTA), adapts the hybrid automatic repeat request (HARQ) timing of the UE communications based on changes in the eIMTA and configurations. The HARQ timing includes HARQ acknowledgement (ACK) timing or HARQ scheduling timing.

28 Claims, 14 Drawing Sheets

Related U.S. Application Data

(60) Provisional application No. 61/933,792, filed on Jan. 30, 2014.

(51) Int. Cl.
  *H04L 5/00* (2006.01)
  *H04W 56/00* (2009.01)
  *H04W 88/06* (2009.01)
  *H04W 24/10* (2009.01)

(52) U.S. Cl.
  CPC ..... *H04W 56/0015* (2013.01); *H04W 72/042* (2013.01); *H04W 24/10* (2013.01); *H04W 72/0446* (2013.01); *H04W 88/06* (2013.01)

(56) References Cited

U.S. PATENT DOCUMENTS

| | | | |
|---|---|---|---|
| 2012/0113831 A1 | 5/2012 | Pelletier et al. | |
| 2012/0230272 A1 | 9/2012 | Kim et al. | |
| 2013/0034028 A1 | 2/2013 | Chen et al. | |
| 2013/0242819 A1 | 9/2013 | He et al. | |
| 2013/0258864 A1 | 10/2013 | Chen et al. | |
| 2014/0003356 A1 | 1/2014 | Wang et al. | |
| 2014/0119246 A1 | 5/2014 | Yin et al. | |
| 2014/0204892 A1* | 7/2014 | Oizumi | H04L 1/00 370/329 |
| 2015/0023229 A1 | 1/2015 | Yin et al. | |

OTHER PUBLICATIONS

Alcatel-Lucent Shanghai Bell et al.,"Scheduling and HARQ timing for TDD-FDD carrier aggregation", 3GPP Draft; R1-135160 Scheduling and HARQ Timing for TDD-FDD Carrier Aggregation—Final, 3rd Generation Partnership Project (3GPP), Mobile Competence Centre ; 650, Route Des Lucioles ; F-06921 Sophia, vol. RAN WG1, No. San Francisco, USA; Nov. 11, 2013-Nov. 15, 2013, Nov. 2, 2013 (Nov. 2, 2013), XP050750783, Retrieved from the Internet: URL:http://www.3gpp.org/ftp/tsg_ran/WG1_RL1/TSGR1_75/Docs/ [retrieved on Nov. 2, 2013].

Huawai Hisilicon., "Discussion on HARQ operation related issues for TDD eiMTA", 3GPP TSG RAN WG1, Nov. 11, 2013 (Nov. 11, 2013), XP002738618, Retrieved from the Internet: URL:http://www.3gpp.org/ftp/tsg_ran/WG1_RL1/TSGR1_75/Docs/R1-135014.zip [retrieved on Apr. 16, 2015].

International Search Report and Written Opinion—PCT/US2015/013430—ISA/EPO—dated May 8, 2015.

IPEA/EPO, Second Written Opinion of the International Preliminary Examining Authority, Int'l App. No. PCT/US2015/013430, dated Jan. 7, 2016, European Patent Office, Rijswijk, NL, 5 pgs.

Mediatek Inc: "PUCCH transmission on Scell for TDD-FDD CA", 3GPP Draft; R1-135429 PUCCH Transmission on SCELL for TDD-FDD CA, 3rd Generation Partnership Project (3GPP), Mobile Competence Centre; 650, Route Des Lucioles; F-06921 Sophia-Antipolis Cedex; Franc, vol. RAN WG1, No. San Francisco, US; Nov. 11, 2013-Nov. 15, 2013, Nov. 13, 2013 (Nov. 13, 2013), pp. 1-5, XP050735104, Retrieved from the Internet: URL:http://www.3gpp.org/ftp/Meetings_3GPP_SYNC/RAN/RAN1/Docs/ [retrieved on Nov. 13, 2013].

Samsung: "Remaining issues on HARQ timing for eiMTA", 3GPP Draft; R1-135190 Remaining Issues on HARQ Timing for EIMTA, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 11, 2013-Nov. 15, 2013, Nov. 13, 2013 (Nov. 13, 2013), XP050734888, Retrieved from the Internet: URL:http://www.3gpp.org/ftp/Meetings_3GPP_SYNC/RAN/RAN1/Docs/ [retrieved on Nov. 13, 2013].

3GPP TS 36.213: "3rd Generation Partnership Project; Technical Specification Group Radio Access Network; Evolved Universal Terrestrial Radio Access (E-UTRA); Physical layer procedures", Release 11, Version 11.4.0, Sep. 20, 2013, 182 Pages, URL: https://www.3gpp.org/ftp/Specs/archive/36_series/36.213/36213-b40.zip,Table 8-0A and10.2-1.

\* cited by examiner

| PDSCH HARQ timing on SCC follows TDD UL-DL configuration # | | PCell SIB1 UL-DL Configuration | | | | | | |
|---|---|---|---|---|---|---|---|---|
| | | 0 | 1 | 2 | 3 | 4 | 5 | 6 |
| Scell SIB1 UL-DL Configuration | 0 | | 1 | 2 | 3 | 4 | 5 | 6 |
| | 1 | 1 | | 2 | 4 | 4 | 5 | 1 |
| | 2 | 2 | 2 | | 5 | 5 | 5 | 2 |
| | 3 | 3 | 4 | 5 | | 4 | 5 | 3 |
| | 4 | 4 | 4 | 5 | 4 | | 5 | 4 |
| | 5 | 5 | 5 | 5 | 5 | 5 | | 5 |
| | 6 | 6 | 1 | 2 | 3 | 4 | 5 | |

FIG. 4A

| PUSCH HARQ timing on SCC follows TDD UL-DL configuration # | | PCell SIB1 UL-DL Configuration | | | | | | |
|---|---|---|---|---|---|---|---|---|
| | | 0 | 1 | 2 | 3 | 4 | 5 | 6 |
| SCell SIB1 UL-DL Configuration | 0 |  | 0 | 0 | 0 | 0 | 0 | 0 |
| | 1 | 1 |  | 1 | 1 | 1 | 1 | 1 |
| | 2 | 1 | 1 |  | 2 | 2 | 2 | 1 |
| | 3 | 3 | 3 | 3 |  | 3 | 3 | 3 |
| | 4 | 1 | 1 | 4 | 3 |  | 4 | 4 |
| | 5 | 1 | 1 | 2 | 3 | 4 |  | 1 |
| | 6 | 6 | 6 | 6 | 6 | 6 | 6 |  |

FIG. 4B

CARRIER AGGREGATION WITH DYNAMIC TDD DL/UL SUBFRAME CONFIGURATION

CROSS REFERENCES

The present Application for Patent is a Continuation of U.S. patent application Ser. No. 14/607,455 by Chen, et al., entitled "Carrier Aggregation With Dynamic TDD DL/UL Subframe Configuration" filed Jan. 28, 2015, which claims priority to U.S. Provisional Patent Application No. 61/933,792 by Chen et al., entitled "Carrier Aggregation With Dynamic TDD DL/UL Subframe Configuration," filed Jan. 30, 2014, assigned to the assignee hereof, and each of which is expressly incorporated herein.

BACKGROUND

Field of the Disclosure

The present disclosure, for example, relates to wireless communication systems, and more particularly to dynamic adaptation of downlink/uplink subframe configurations based on actual traffic needs known as evolved interference management for traffic adaptation (eIMTA).

Description of the Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless communication network may include a number of base stations that can support communication for a number of mobile devices. A mobile device may communicate with a base station via downlink (DL) and uplink (UL) transmissions. The downlink (or forward link) refers to the communication link from the base station to the mobile device, and the uplink (or reverse link) refers to the communication link from the mobile device to the base station.

Multiple access technologies may use Frequency Division Duplexing (FDD) or Time Division Duplexing (TDD) to provide uplink and downlink communications over one or more carriers. TDD operation offers flexible deployments without requiring paired spectrum resources. TDD formats include transmission of frames of data, each including a number of different subframes in which different subframes may be uplink or downlink subframes. In systems that operate using TDD, different formats may be used in which uplink and downlink communications may be asymmetric. Flexible TDD DL/UL configuration provides efficient ways to use unpaired spectrum resources and TDD configuration may be adaptive based on traffic conditions (e.g., UL/DL loading at the base station and/or mobile device).

The wireless communication networks including the base stations and mobile devices may support operation on multiple carriers which may be called carrier aggregation. Carrier aggregation may be used to increase throughput between a base station supporting multiple component carriers and a mobile device, and mobile devices may be configured to communicate using multiple component carriers associated with multiple base stations. Other techniques for increasing throughput using multiple carriers may be used where base stations performing joint operations have non-ideal backhaul (e.g., dual-connectivity, etc.).

In some instances of carrier aggregation, both FDD and TDD frame structures may be supported. FDD and TDD support may include support for combinations of FDD and TDD frame structures on multiple carriers, as well as dynamic adaptation of the frame structures. Dynamic adaptation may result in interference based on carriers using different frame structures.

SUMMARY

In a carrier aggregation or dual-connectivity configuration, a user equipment (UE) may use more than one component carrier. When at least one of the component carriers is enabled to use evolved interference management for traffic adaptation (eIMTA) (i.e., dynamic adaptation of the component carrier's TDD DL/UL subframe configuration may be supported), then the potential for interference arises. As a result, a UE may be configured to determine an appropriate hybrid automatic repeat request (HARQ) timing in order to compensate for changes in the component carrier configurations, and particularly for changes due to eIMTA operation. The UE may then communicate on the at least one of the component carriers based on the determined HARQ timing. The HARQ timing may include HARQ acknowledgement (ACK) timing and HARQ scheduling timing.

According to a first set of illustrative embodiments, a method for wireless communication may include receiving a configuration comprising at least a first component carrier (CC) and a second CC, wherein the first CC and the second CC may be configured for a carrier aggregation (CA) or dual-connectivity operation. At least one of the CCs may be subject to an evolved interference management for traffic adaptation (eIMTA) configuration. The method may also include determining hybrid automatic repeat request (HARQ) timing for at least one of the first CC and the second CC, wherein the HARQ timing is determined based at least in part on the received configuration and whether the at least one of the first CC and the second CC is subject to the eIMTA configuration. Additionally, the method may also include communicating using the at least one of the first CC and the second CC based at least in part on the determined HARQ timing.

In certain examples, the method may include determining the HARQ timing based on a dynamically configured downlink/uplink (DL/UL) subframe configuration of the at least one CC that is subject to the eIMTA. Alternatively, the method may include determining the HARQ timing based on a semi-static downlink/uplink (DL/UL) subframe configuration of the at least one CC that is subject to the eIMTA. In an example, a UL HARQ timing is determined based on a subframe configuration indicated in a broadcast system information block (SIB) message for the at least one CC, and a DL HARQ timing is determined based on a subframe configuration indicated by a radio resource control (RRC) message.

In certain examples, the HARQ timing may include at least one of HARQ acknowledgement (ACK) timing and HARQ scheduling. In this case, determining the HARQ timing may be based, at least in part, on at least one of the following: whether the first and second CCs have a time-domain duplex (TDD) or a frequency-domain duplex (FDD) carrier type, a cross-carrier scheduling configuration for the first and second CCs, designation of the first and second CCs as primary or secondary CCs, a number of physical uplink control channels (PUCCHs), or whether the first CC and the second CC are configured for a carrier aggregation operation or a dual-connectivity operation. A specific example may include when the at least one CC that is subject to eIMTA is the primary CC and the number of PUCCHs is one, with the one PUCCH being on the primary CC, then the HARQ timing for both the primary CC and the secondary CC may be based on a semi-static DL/UL subframe configuration of the primary CC. Another specific example may include when the at least one CC that is subject to eIMTA is a secondary CC and the primary CC is of a TDD carrier type, then the HARQ timing for both the primary CC and the secondary CC may be based on a semi-static DL/UL subframe configuration of the secondary CC. A further specific example may include when the at least one CC that is subject to eIMTA is the secondary CC and the primary CC is of an FDD carrier type, then the HARQ timing for the secondary CC may be based on a dynamic DL/UL subframe configuration of the secondary CC. Thus, acknowledgement/negative acknowledgement (ACK/NAK) bundling may be avoided. Yet another specific example may include when the at least one CC that is subject to eIMTA is the secondary CC, and the primary CC is of a TDD carrier type, then the HARQ timing for the secondary CC may be based on a dynamic DL/UL subframe configuration of the secondary CC. Once again, acknowledgement/negative acknowledgement (ACK/NAK) bundling may be avoided.

In certain examples, the communication may include uplink control information (UCI) reporting and the HARQ timing may indicate one or more subframes for sending the UCI reporting. In this case, the method may further include prioritizing sending of the UCI based on whether the UCI reporting is for the at least one CC that is subject to eIMTA or whether the UCI reporting is associated with a fixed or a dynamically-determined subframe. Alternatively, the method may further include prioritizing power allocation to the first and second CCs based on whether the UCI reporting is for the at least one CC that is subject to eIMTA or whether the UCI reporting is associated with a fixed or a dynamically-determined subframe.

When the communication includes UCI reporting, the method may also include determining the HARQ timing for sending the UCI reporting is based, at least in part, on whether the at least one CC that is subject to eIMTA is the CC which carries a physical uplink control channel (PUCCH). In this case, if the at least one CC that is subject to eIMTA is the CC which carries a PUCCH, then the HARQ timing for sending UCI reporting on the at least one CC that is subject to eIMTA may use fixed uplink subframes. The UCI reporting may be for the CC which carries the PUCCH, and the fixed uplink subframes may be indicated by a semi-static DL/UL subframe configuration of the CC which carries the PUCCH. Alternatively, the UCI reporting may be for CCs which do not carry the PUCCH, and the fixed uplink subframes may be indicated by a semi-static DL/UL subframe configuration of the CCs which do not carry the PUCCH.

When the communication includes UCI reporting, and the method includes that determining the HARQ timing for sending the UCI reporting is based, at least in part, on whether the at least one CC that is subject to eIMTA is the CC which carries a physical uplink control channel (PUCCH), the method may further include that if the at least one CC that is subject to eIMTA is the CC which carries a PUCCH, then the HARQ timing for sending UCI reporting on the at least one CC that is subject to eIMTA uses dynamically-determined uplink subframes. In this case, the UCI reporting may be for the CC which carries the PUCCH, and the dynamically-determined uplink subframes may be indicated by a dynamic DL/UL subframe configuration of the CC which carries the PUCCH. Alternatively, the UCI reporting may be for CCs which do not carry the PUCCH, and the dynamically-determined uplink subframes may be indicated by a dynamic DL/UL subframe configuration of the CCs which do not carry the PUCCH.

When the communication includes UCI reporting, and the method includes that determining the HARQ timing for sending the UCI reporting is based, at least in part, on whether the at least one CC that is subject to eIMTA is the CC which carries a physical uplink control channel (PUCCH), the method may further include that if the at least one CC that is subject to eIMTA is not the CC which carries a PUCCH, then the HARQ timing for sending UCI reporting on the CC which carries the PUCCH uses fixed uplink subframes. In this case, the fixed uplink subframes may be indicated by a semi-static DL/UL subframe configuration of the CC which carry the PUCCH. The UCI reporting may be for a CC which does not carry the PUCCH, and the UCI reporting may be configured based on a semi-static or dynamic DL/UL subframe configuration of the CC for which the UCI reporting pertains.

According to a second set of illustrative embodiments, an apparatus for wireless communication may include means for receiving a configuration comprising at least a first component carrier (CC) and a second CC, wherein at least one of the CCs is subject to evolved interference management for traffic adaptation (eIMTA) configuration. The configuration may include a carrier aggregation (CA) or dual connectivity operation. The apparatus may also include means for determining hybrid automatic repeat request (HARQ) timing for at least one of the first CC and the second CC, wherein the HARQ timing is determined based at least in part on the received configuration and whether the at least one of the first CC and the second CC is subject to the eIMTA configuration. Additionally, the apparatus may include means for communicating using the at least one of the first CC and the second CC based at least in part on the determined HARQ timing.

In certain examples, the means for determining the HARQ timing may include means for determining the HARQ timing based on a dynamically configured downlink/uplink (DL/UL) subframe configuration of the at least one CC that is subject to the eIMTA. Alternatively, in another example, the means for determining the HARQ timing may include means for determining the HARQ timing based on a semi-static downlink/uplink (DL/UL) subframe configuration of the at least one CC that is subject to the eIMTA. In certain examples, the HARQ timing may include HARQ acknowledgement (ACK) timing and HARQ scheduling. In other examples, the communication may include uplink control information (UCI) reporting and the HARQ timing may indicate one or more subframes for sending the UCI reporting.

In certain examples where the HARQ timing may include HARQ ACK timing or HARQ scheduling timing, the means for determining the HARQ timing may include means for determining the HARQ timing based, at least in part, on at least one of the following: whether the first and second CCs have a time-domain duplex (TDD) or a frequency-domain duplex (FDD) carrier type, a cross-carrier scheduling configuration for the first and second CCs, designation of the first and second CCs as primary or secondary CCs, a number of physical uplink control channels (PUCCHs), or whether the first CC and the second CC are configured for a carrier aggregation operation or a dual-connectivity operation. In specific examples, if the at least one CC that is subject to eIMTA is the primary CC and the number of PUCCHs is one, with the one PUCCH being on the primary CC, then the HARQ timing for both the primary CC and the secondary CC may be based on a semi-static DL/UL subframe configuration of the primary CC. In another specific example, if the at least one CC that is subject to eIMTA is the secondary CC and the primary CC is of a TDD carrier type, then the HARQ timing for both the primary CC and the secondary CC may be determined based on a semi-static DL/UL subframe configuration of the secondary CC. In yet another specific example, if the at least one CC that is subject to eIMTA is the secondary CC and the primary CC is of an FDD carrier type, then the HARQ timing option for the secondary CC may be based on a dynamic DL/UL subframe configuration of the secondary CC. In yet another specific example, if the at least one CC that is subject to eIMTA is the secondary CC, and the primary CC is of a TDD carrier type, then the HARQ timing for the secondary CC may be based on a dynamic DL/UL subframe configuration of the secondary CC.

In certain examples where the communication may include UCI reporting, the means for selecting the HARQ timing may include means for determining the HARQ timing for sending the UCI reporting based, at least in part, on whether the at least one CC that is subject to eIMTA is the CC which carries a physical uplink control channel (PUCCH). In this case, if the at least one CC that is subject to eIMTA is the CC which carries a PUCCH, then the HARQ timing for sending UCI reporting on the at least one CC that is subject to eIMTA may use fixed uplink subframes. The UCI reporting may be for the CC which carries the PUCCH, and the fixed uplink subframes may be indicated by a semi-static DL/UL subframe configuration of the CC which carries the PUCCH. Alternatively, the UCI reporting may be for CCs which do not carry the PUCCH, and the fixed uplink subframes may be indicated by a semi-static DL/UL subframe configuration of the CCs which do not carry the PUCCH.

In certain examples where the communication may include UCI reporting, the means for determining the HARQ timing may include means for determining the HARQ timing for sending the UCI reporting based, at least in part, on whether the at least one CC that is subject to eIMTA is the CC which carries a physical uplink control channel (PUCCH). In this case, if the at least one CC that is subject to eIMTA is the CC which carries a PUCCH, then the HARQ timing for sending UCI reporting on the at least one CC that is subject to eIMTA may use dynamically-determined uplink subframes. The UCI reporting may be for the CC which carries the PUCCH, and the dynamically-determined uplink subframes may be indicated by a dynamic DL/UL subframe configuration of the CC which carries the PUCCH. Alternatively, the UCI reporting may be for CCs which do not carry the PUCCH, and the dynamically-determined uplink subframes may be indicated by a dynamic DL/UL subframe configuration of the CCs which do not carry the PUCCH.

In certain examples where the communication may include UCI reporting, the means for determining the HARQ timing may include means for determining the HARQ timing for sending the UCI reporting based, at least in part, on whether the at least one CC that is subject to eIMTA is the CC which carries a physical uplink control channel (PUCCH). In this case, if the at least one CC that is subject to eIMTA is not the CC which carries a PUCCH, then the HARQ timing for sending UCI reporting on the CC which carries the PUCCH may use fixed uplink subframes. The fixed uplink subframes may be indicated by a semi-static DL/UL subframe configuration of the CC which carry the PUCCH. The UCI reporting may be for a CC which does not carry the PUCCH, and the UCI reporting may be configured based on a semi-static or dynamic DL/UL subframe configuration of the CC for which the UCI reporting pertains.

In certain examples where the communication may include UCI reporting, the apparatus may further include means for prioritizing sending of the UCI based on whether the UCI reporting is for the at least one CC that is subject to eIMTA or whether the UCI reporting is associated with a fixed or a dynamically-determined subframe. Additionally, the apparatus may further include means for prioritizing power allocation to the first and second CCs based on whether the UCI reporting is for the at least one CC that is subject to eIMTA or whether the UCI reporting is associated with a fixed or a dynamically-determined subframe.

According to yet another set of illustrative embodiments, an apparatus may include at least one processor and may also include a memory coupled to the at least one processor. The memory may store instructions executable by the processor. The stored instructions may include instructions to receive a configuration comprising at least a first component carrier (CC) and a second CC in a carrier aggregation (CA) configuration, wherein at least one of the CCs is subject to evolved interference management for traffic adaptation (eIMTA) configuration. The first CC and the second CC may be configured for a carrier aggregation (CA) operation or a dual-connectivity operation. The instructions may also include instructions to determine hybrid automatic repeat request (HARQ) timing for at least one of the first CC and the second CC, the determined HARQ timing based at least in part on the received configuration and whether the at least one of the first CC and the second CC is subject to the eIMTA configuration. Instructions to communicate using the at least one of the first CC and the second CC based at least in part on the determined HARQ timing may also be included.

In certain examples, the instructions may be executable to determine the HARQ timing based on a dynamically configured downlink/uplink (DL/UL) subframe configuration of the at least one CC that is subject to the eIMTA. Alternatively, the instructions may be executable to determine the HARQ timing based on a semi-static downlink/uplink (DL/UL) subframe configuration of the at least one CC that is subject to the eIMTA. In certain examples, the HARQ timing may include at least one of HARQ acknowledgement (ACK) timing and HARQ scheduling. In other examples, the communication may include uplink control information (UCI) reporting and the HARQ timing may indicate one or more subframes for sending the UCI reporting. In this case, the instructions may be executable to prioritize sending of the UCI based on whether the UCI reporting is for the at least one CC that is subject to eIMTA or whether the UCI reporting is associated with a fixed or a dynamically-determined subframe. In another example, the instructions may be executable to prioritize power allocation to the first and second CCs based on whether the UCI reporting is for the at least one CC that is subject to eIMTA or whether the UCI reporting is associated with a fixed or a dynamically-determined subframe.

According to another set of illustrative embodiments, a computer program product may include a non-transitory computer-readable medium having non-transitory program code recorded thereon. The non-transitory program code may include program code to receive a configuration that includes at least a first component carrier (CC) and a second CC, wherein at least one of the first CC and the second CC is subject to an evolved interference management for traffic adaptation (eIMTA) configuration. The first CC and the second CC may be configured for a carrier aggregation (CA) or a dual-connectivity operation. Program code may also be included to determine hybrid automatic request (HARQ) timing for at least one of the first CC and the second CC, the determined HARQ timing based at least in part on the received configuration and whether the at least one of the first CC and the second CC is subject to the eIMTA configuration. Further, the non-transitory program code may include program code to communicate using the at least one of the first CC and the second CC based at least in part on the determined HARQ timing.

In certain examples, the program code may further include program code to determine the HARQ timing based on a dynamically configured downlink/uplink (DL/UL) subframe configuration of the at least one CC that is subject to the eIMTA. Alternatively, the program code may further include program code to determine the HARQ timing based on a semi-static downlink/uplink (DL/UL) subframe configuration of the at least one CC that is subject to the eIMTA. The HARQ timing may include HARQ acknowledgement (ACK) timing or HARQ scheduling. Alternatively, the communication may include uplink control information (UCI) reporting and the HARQ timing may indicate one or more subframes for sending the UCI reporting. In this case, the program code may further include program code to prioritize sending of the UCI based on whether the UCI reporting is for the at least one CC that is subject to eIMTA or whether the UCI reporting is associated with a fixed or a dynamically-determined subframe. Additionally, the program code may further include program code to prioritize power allocation to the first and second CCs based on whether the UCI reporting is for the at least one CC that is subject to eIMTA or whether the UCI reporting is associated with a fixed or a dynamically-determined subframe.

The foregoing has outlined rather broadly the features and technical advantages of examples according to the disclosure in order that the detailed description that follows may be better understood. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 4A and 4B show tables used for determining hybrid automatic repeat request (HARD) timing based on downlink/uplink subframe configurations;

DETAILED DESCRIPTION

Figure 1:
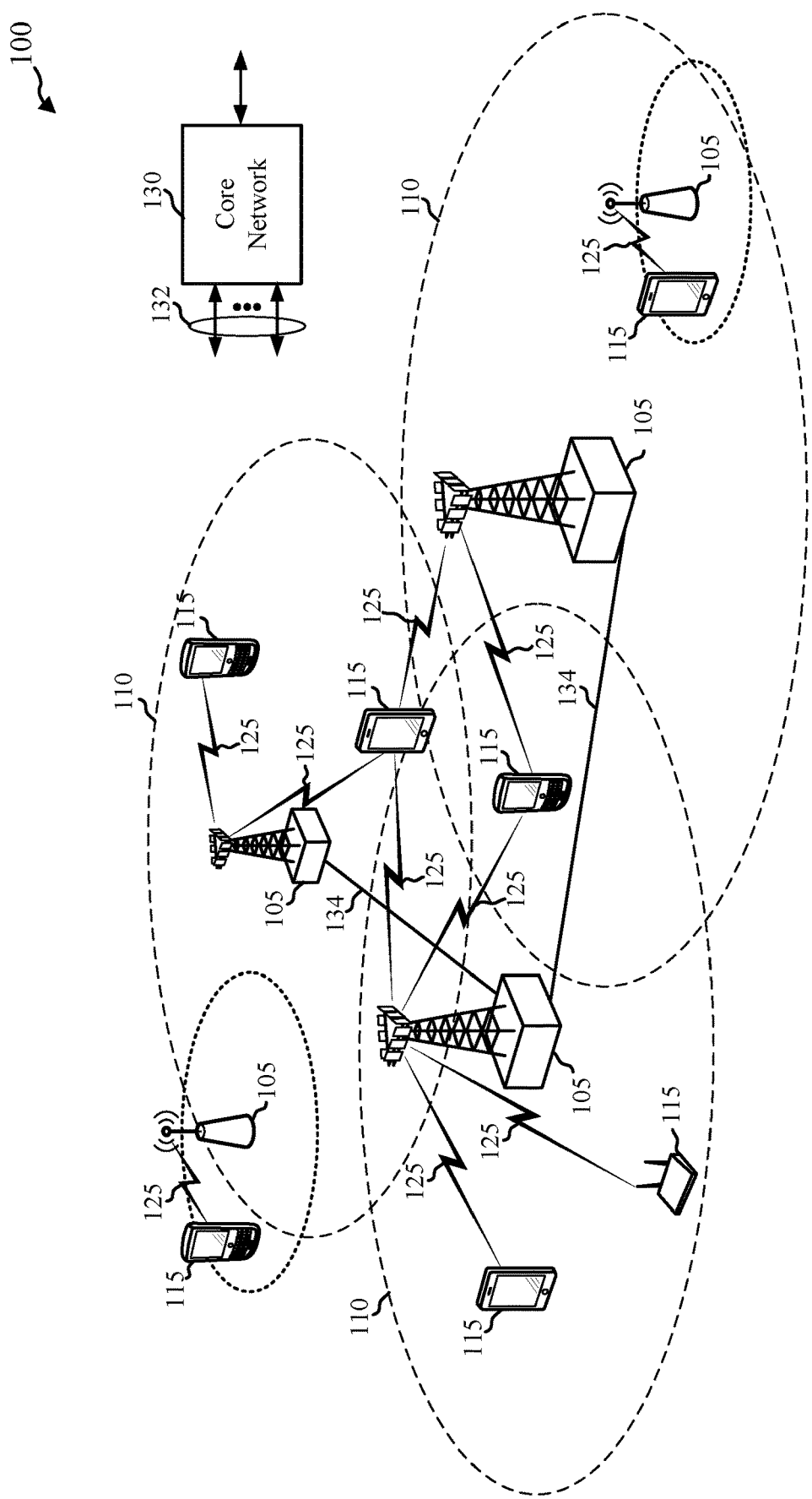
FIG. 1 shows a diagram illustrating an example of a wireless communications system.

Described embodiments are directed to systems and methods for multi-carrier communications (such as carrier aggregation and dual/multi connectivity configurations) for a device in a wireless communications network employing dynamic adaptation of TDD DL/UL subframe configurations of one or more component carriers. Dynamic adaptation in multi-carrier communications can result in timing complexities, specifically as these timing complexities relate to hybrid automatic repeat request (HARQ) timing and uplink control information (UCI) transmission.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The system 100 may also support dynamic adaptation of one or more of the carriers or communication links 125. When the communication links 125 are dynamically changed, timing systems used by the communication devices 115 may need to be adjusted in order to avoid interference.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

The communication devices 115 are dispersed throughout the wireless communications system 100, and each device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A communication device 115 may be a cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The transmission links 125 shown in the system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

In embodiments, the system 100 is an LTE/LTE-A network. In LTE/LTE-A networks, the terms evolved Node B (eNB) and user equipment (UE) may be generally used to describe the base stations 105 and communication devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The wireless communications system 100 according to an LTE/LTE-A network architecture may be referred to as an Evolved Packet System (EPS) 100. The EPS 100 may include one or more UEs 115, an Evolved UMTS Terrestrial Radio Access Network (E-UTRAN), an Evolved Packet Core (EPC) 130 (e.g., core network 130), a Home Subscriber Server (HSS), and an Operator's IP Services. The EPS may interconnect with other access networks using other Radio Access Technologies. For example, EPS 100 may interconnect with a UTRAN-based network and/or a CDMA-based network via one or more Serving GPRS Support Nodes (SGSNs). To support mobility of UEs 115 and/or load balancing, EPS 100 may support handover of UEs 115 between a source eNB 105 and a target eNB 105. EPS 100 may support intra-RAT handover between eNBs 105 and/or base stations of the same RAT (e.g., other E-UTRAN networks), and inter-RAT handovers between eNBs and/or base stations of different RATs (e.g., E-UTRAN to CDMA, etc.). The EPS 100 may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface, and the like). The eNBs 105 may provide an access point to the EPC 130 for the UEs 115. The eNBs 105 may be connected by backhaul link 132 (e.g., an S1 interface, and the like) to the EPC 130. Logical nodes within EPC 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

UEs 115 and eNBs 105 may be configured to collaboratively communicate through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The downlink physical channels may include at least one of a physical downlink control channel (PDCCH), a physical HARQ indicator channel (PHICH), and a physical downlink shared channel (PDSCH). The uplink physical channels may include at least one of a physical uplink control channel (PUCCH) and a physical uplink shared channel (PUSCH). The PDCCH may carry downlink control information (DCI), which may indicate data transmissions for UEs on the PDSCH as well as provide UL resource grants to UEs for the PUSCH. The UE may transmit control information in the PUCCH on the assigned resource blocks in the control section. The UE may transmit only data or both data and control information in the PUSCH on the assigned resource blocks in the data section.

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Time intervals may be expressed in multiples of a basic time unit $$T_s = \frac{1}{30720000}.$$

Each frame structure may have a radio frame length $T_f=307200 \cdot T_s=10$ ms and may include two half-frames or slots of length $153600 \cdot T_s=5$ ms each. Each half-frame may include five subframes of length $30720 \cdot T_s=1$ ms.

LTE/LTE-A networks support multi-process Type II HARQ with a configurable number of independent HARQ processes. Each HARQ process waits to receive an acknowledgement (ACK) or negative acknowledgement (NAK) before transmitting a new data or transport block. LTE/LTE-A uses asynchronous HARQ transmission on the downlink and synchronous HARQ transmission on the uplink. In both asynchronous and synchronous HARQ, ACK/NAK information may be provided a certain number of subframes after a DL or UL transmission. Generally, for LTE/LTE-A FDD carriers, ACK/NAK information for a HARQ process is transmitted 4 subframes after a data transmission. In asynchronous HARQ, a schedule for subsequent transmissions is not predetermined and the eNB provides instructions to the UE regarding which HARQ process are transmitted in each subframe. For synchronous HARQ in FDD, UEs perform a second transmission of a particular HARQ process a predetermined number of subframes after receiving a NAK. Generally, for LTE/LTE-A FDD carriers, subsequent UL transmissions of the same HARQ process occur 4 subframes after receiving a NAK. For synchronous HARQ in TDD, ACK/NAK information may be received in a subframe i associated with UL transmissions in a subframe i–k, where k may be defined according to TDD UL/DL configuration. Subsequent transmissions of particular HARQ processes may be performed in a subframe n for a NAK received in a subframe n–k, where k may be defined according to TDD UL/DL configuration.

Figure 2:
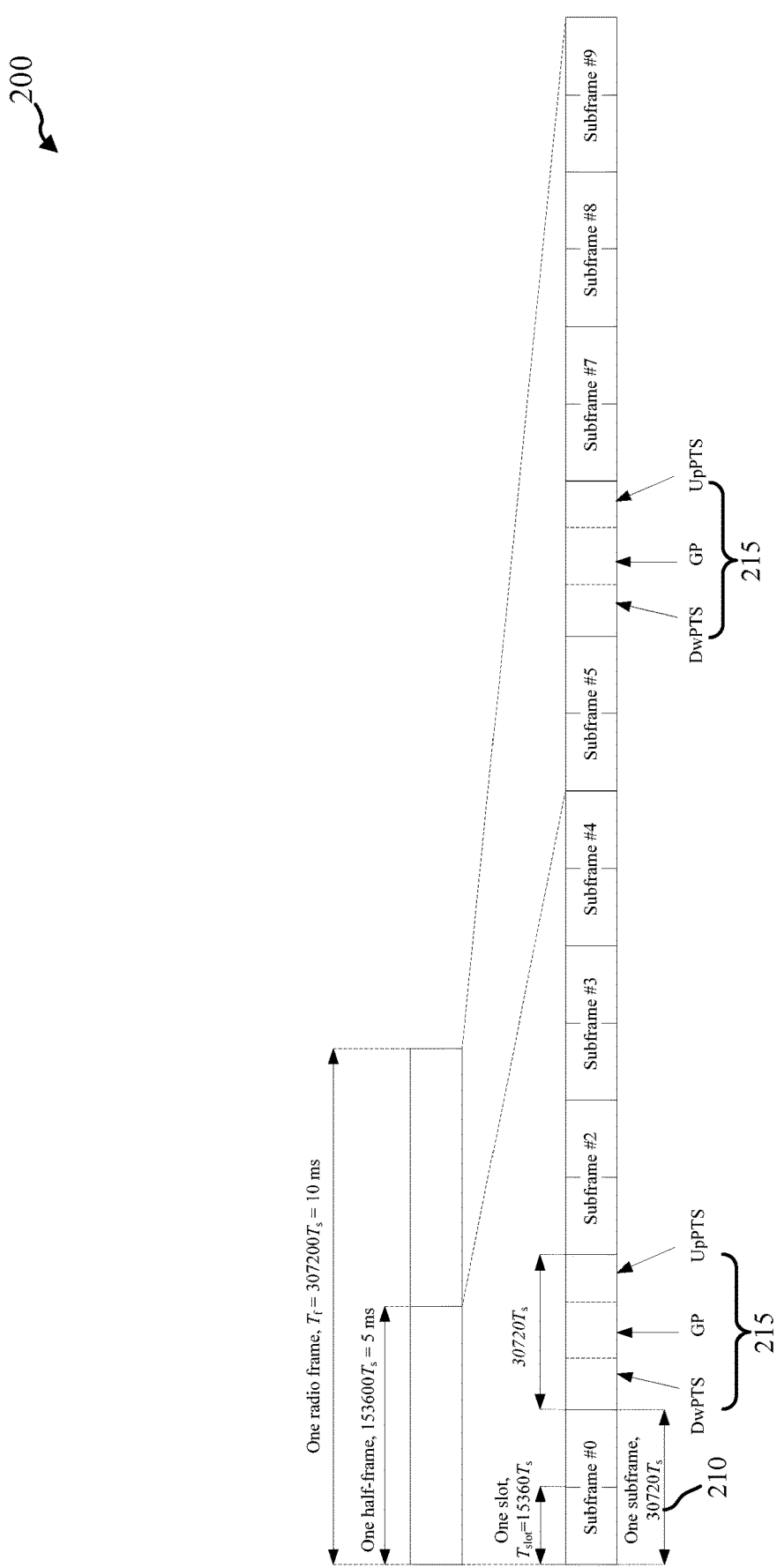
FIG. 2 shows a frame structure for a time-division duplexed (TDD) carrier.

FIG. 2 illustrates a frame structure 200 for a TDD carrier. For TDD frame structures, each subframe 210 may carry UL or DL traffic, and special subframes ("S") 215 may be used to switch between DL to UL transmission. Allocation of UL and DL subframes within radio frames may be symmetric or asymmetric and may be reconfigured semi-statically or dynamically. Special subframes 215 may carry some DL and/or UL traffic and may include a Guard Period (GP) between DL and UL traffic. Switching from UL to DL traffic may be achieved by setting timing advance at the UEs without the use of Special subframes or a guard period between UL and DL subframes. TDD configurations with switch-point periodicity equal to the frame period (e.g., 10 ms) or half of the frame period (e.g., 5 ms) may be supported. For example, TDD frames may include one or more Special frames, and the period between Special frames may determine the TDD DL-to-UL switch-point periodicity for the frame.

For LTE/LTE-A, seven different TDD UL/DL configurations are defined that provide between 40% and 90% DL subframes as illustrated in Table 1.

TABLE 1

TDD Configurations

| TDD Configuration | Period (ms) | Subframe | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

Because some TDD UL/DL configurations have fewer UL subframes than DL subframes, several techniques may be used to transmit ACK/NAK information for an association set within a PUCCH transmission in the uplink subframe. For example, bundling may be used to combine ACK/NAK information to reduce the amount of ACK/NAK information to be sent. ACK/NAK bundling may combine the ACK/NAK information into a single bit that is set to an acknowledgement (ACK) value only if the ACK/NAK information for each subframe of the association set is an ACK. For example, ACK/NAK information may be a binary '1' to represent ACK and a binary '0' to represent a negative acknowledgement (NACK) for a particular subframe. ACK/NAK information may be bundled using a logical AND operation on the ACK/NAK bits of the association set. Bundling reduces the amount of information to be sent over the PUCCH and therefore increases the efficiency of HARQ ACK/NAK feedback. Multiplexing may be used to transmit multiple bits of ACK/NAK information in one uplink subframe. For example, up to four bits of ACK/NAK may be transmitted using PUCCH format 1b with channel selection.

Wireless network 100 may support operation on multiple carriers, which may be referred to as carrier aggregation (CA) or multi-carrier operation. A carrier may also be referred to as a component carrier (CC), a layer, a channel, etc. The terms "carrier," "layer," "CC," and "channel" may be used interchangeably herein. A carrier used for the downlink may be referred to as a downlink CC, and a carrier used for the uplink may be referred to as an uplink CC. A UE 115 may be configured with multiple downlink CCs and one or more uplink CCs for carrier aggregation. Multi-layer eNBs 105 may be configured to support communications with UEs over multiple CCs on the downlink and/or uplink. Thus, a UE 115 may receive data and control information on one or more downlink CCs from one multi-layer eNB 105 or from multiple eNBs 105 (e.g., single or multi-layer eNBs). The UE 115 may transmit data and control information on one or more uplink CCs to one or more eNBs 105. Carrier aggregation may be used with both FDD and TDD component carriers. For DL carrier aggregation, multiple bits of ACK/NAK are fed back when multiple DL transmissions occur in one subframe. Up to 22 bits of ACK/NAK may be transmitted using PUCCH format 3 for DL carrier aggregation.

Figure 3:
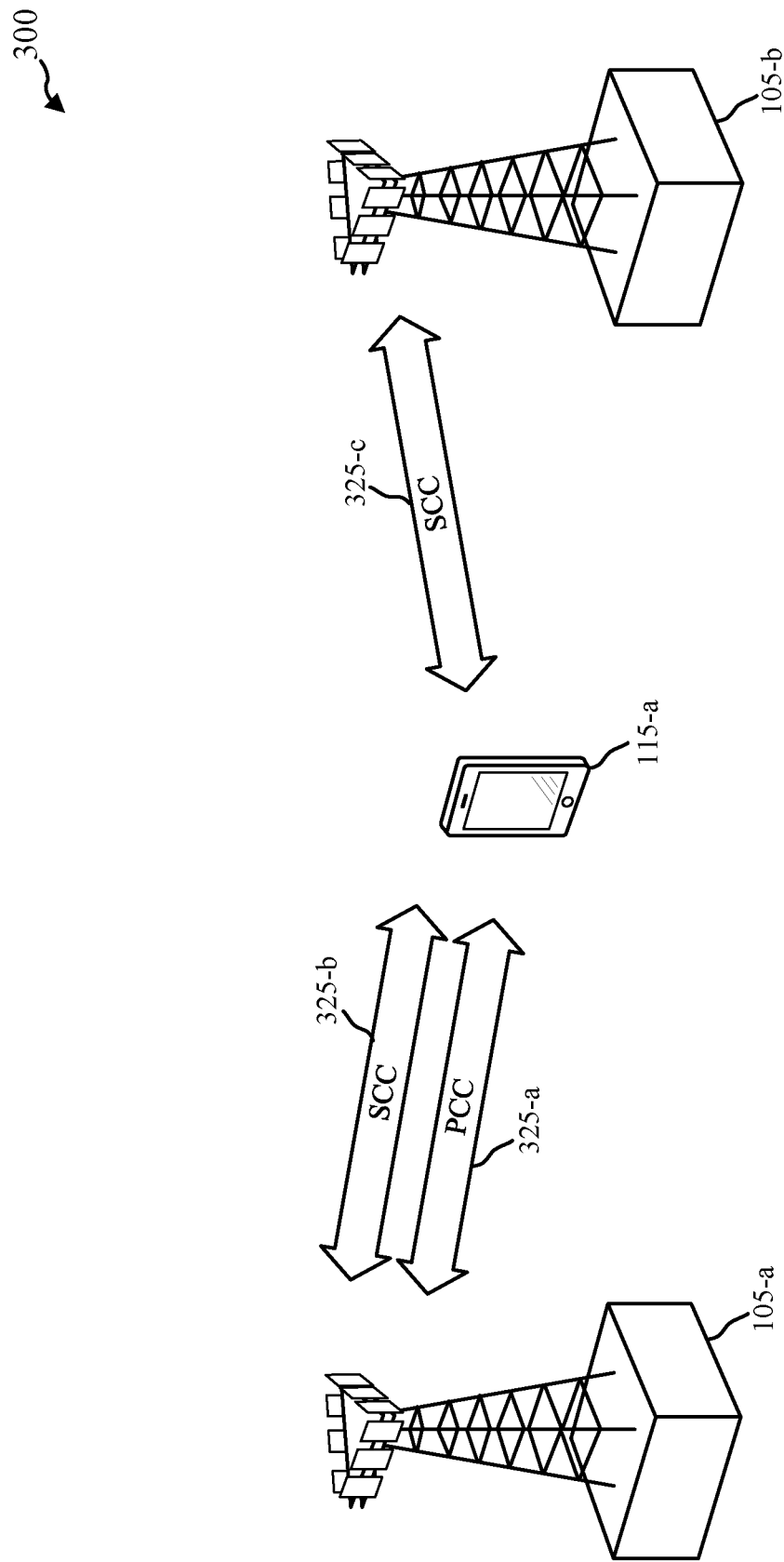
FIG. 3 shows a system employing carrier aggregation.

FIG. 3 shows a system 300 employing carrier aggregation in accordance with various embodiments. The system 300 may illustrate aspects of the system 100. The system 300 can include one or more eNBs 105 using one or more component carriers 325 ($CC_1$-$CC_N$) to communicate with UEs 115. The eNBs 105 can transmit information to the UEs 115 over forward (downlink) channels on component carriers 325. In addition, the UEs 115 can transmit information to the eNB 105-a over reverse (uplink) channels on component carriers 325. In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like. One or more of the component carriers $CC_1$-$CC_N$ 325 can be in the same frequency operating band (intra-band) or in different operating bands (inter-band) and intra-band CCs can be contiguous or non-contiguous within the operating band.

In the system 300, UEs 115 may be configured with multiple CCs associated with one or more eNBs 105. One CC is designated as the primary CC (PCC) for a UE 115. PCCs may be semi-statically configured by higher layers (e.g., RRC, etc.) on a per-UE basis. Certain UCI (e.g., ACK/NAK, channel quality information (CQI), scheduling requests (SR), etc.), when transmitted on PUCCH, are carried by the PCC. The UEs 115 may be configured with asymmetric DL-to-UL CC assignments. In LTE/LTE-A, up to 5:1 DL-to-UL mapping is supported. Thus, one UL CC (e.g., PCC UL) may carry UCI (e.g., ACK/NAK) on PUCCH for up to 5 DL CCs.

In the example illustrated in FIG. 3, UE 115-a is configured with PCC 325-a and SCC 325-b associated with eNB 105-a and SCC 325-c associated with eNB 105-b. The system 300 may be configured to support carrier aggregation using various combinations of FDD and/or TDD CCs 325. For example, some configurations of system 300 may support carrier aggregation for FDD CCs (e.g., an FDD PCC and one or more FDD SCCs). Other configurations may support carrier aggregation using TDD CCs (e.g., a TDD PCC and one or more TDD SCCs). In some examples, the TDD SCCs for carrier aggregation have the same DL/UL configuration while other examples support TDD carrier aggregation with CCs of different DL/UL configurations.

In some embodiments, the system 300 may support TDD-FDD joint operation, including carrier aggregation and other types of joint operation (e.g., dual-connectivity when eNBs 105 of the multiple CCs configured for a UE 115 have non-ideal backhaul capabilities and schedule their transmissions separately, etc.). TDD-FDD joint operation may allow UEs 115 supporting FDD and TDD carrier aggregation operation to access both FDD and TDD CCs using carrier aggregation or in single CC mode. In addition, legacy UEs with various capabilities (e.g., single mode UEs, FDD carrier aggregation capable UEs, TDD carrier aggregation capable UEs, etc.), may connect to FDD or TDD carriers of system 300.

Because the timing of a HARQ process, for example, is dependent upon whether FDD or TDD is being used, and because carrier aggregation (CA) may support FDD, TDD (same or different DL/UL configurations), and TDD-FDD operations, the timing of a HARQ process in a CA system can be complex. While HARQ timing for FDD CA and TDD CA having the same DL/UL configurations may be performed as described above, the HARQ timing for TDD CA having different DL/UL configurations and TDD-FDD operations includes additional options as described below.

In general, HARQ timing for TDD CA systems having different component carrier (CC) DL/UL subframe configurations is based on the DL/UL subframe configurations of the component carriers, as well as whether cross-carrier scheduling is supported. For example, when cross-carrier scheduling is not supported (i.e., when operating under self-carrier scheduling), and for PDSCH HARQ timing, the communication on the PCC with a primary serving cell (PCell) follows the HARQ timing set by the DL/UL subframe configuration included in a system information block (SIB) (for example, SIB1) of the PCell. In contrast, communication on the SCCs with secondary serving cells (SCells) may follow one of three different cases. In Case A, the communication on the SCC follows the same timing used for communication with the PCell. In Case B, the communication on the SCC follows the HARQ timing set by the DL/UL subframe configuration included in SIB1, for example, of the SCell. In Case C, communication on the SCC follows the HARQ timing set by a DL/UL configuration that is different from the configurations indicated by either the PCell or the SCell. An example of when and how each of Cases A, B and C are applied is illustrated in FIG. 4A.

FIG. 4A shows a PDSCH HARQ timing configuration index table 400 for TDD CA when the CC DL/UL configurations are different. On the left of the table 400 are the SCell UL-DL configuration index numbers 405, as indicated by the SIB1 for the SCell. On the top of the table 400 are the PCell UL-DL configuration index numbers 410, as indicated by the SIB1 for the PCell. The configuration to be applied for any given combination of PCC and SCC configurations is illustrated in the middle 415 of the table 400. As an example of Case A, when an SCell has a configuration index of 1 and the PCell has a configuration index of 2, the UL/DL configuration to be utilized for HARQ timing with carrier aggregation is 2, the configuration of the PCell. As an example of Case B, when an SCell has a configuration index of 4 and the PCell has a configuration index of 1, the UL/DL configuration to be utilized for HARQ is 4, the configuration of the SCell. Examples of Case C, where the to-be-applied configuration differs from both the PCell and the SCell configurations, include when an SCell configuration index is 3 and the PCell configuration index is either 1 or 2, for example.

PDSCH HARQ timing varies also when cross-carrier scheduling is supported. When cross-carrier scheduling is supported, the SCC PDSCH HARQ timing reference configuration is the SIB1 UL-DL configuration of the PCell.

For PUSCH HARQ timing, variations also exist in the cases of either self-scheduling or cross-carrier scheduling. In the case of self-scheduling, each carrier follows the UL-DL configuration of its respective eNB, as indicated in SIB1 of the eNB, regardless of whether the carriers are PCC or SCC. Thus, the PCC follows the UL-DL configuration of the PCell, and an SCC follows the UL-DL configuration of the respective SCell. In the case of cross-carrier scheduling, however, PUSCH HARQ timing may be classified into four different categories.

In Case A, SCell uplink subframes are a subset of the uplink subframes indicated by the PCell SIB1 configuration, and thus HARQ timing for the SCC follows the UL/DL configuration of the PCell. In Case B, the SCell uplink subframes are a superset of the uplink subframes indicated by the PCell SIB1 configuration, while in Case C, the SCell uplink subframes are neither a superset nor a subset of the uplink subframes indicated by the PCell SIB1 configuration. In Cases B and C, the HARQ timing for the SCC follows the SCell configuration. Case D relates to instances where the PCell SIB1 indicates that the PUSCH round-trip time is something other than 10 ms (whereas 10 ms is indicated to be the PUSCH round-trip time in Cases A, B and C). In Case D, some of the combinations of configuration indices result in an uplink HARQ timing that follows TDD configuration 1, while other combinations of configuration indices result in an uplink HARQ timing that follows the timing of the SCell. The combinations of configuration indices that result in an uplink HARQ timing that follows TDD UL/DL configuration 1 include the following, where the first number in the set is the configuration index of the PCell and the second number in the set is the configuration index of the SCell: {6,2}, {6,5}, {0,2}, {0,4}, {0,5}. Examples of each of these cases are described below.

FIG. 4B shows a PUSCH HARQ timing table 450 for TDD CA when the CC DL/UL configurations are different. On the left of the table 450 are the SCell UL-DL configuration index numbers 455, as indicated by the SIB1 for the SCell. On the top of the table 450 are the PCell UL-DL configuration index numbers 460, as indicated by the SIB1 for the PCell. The configuration to be applied for any given combination of PCC and SCC configurations is illustrated in the middle 465 of the table 450. As an example of Case A, when an SCell has a configuration index of 4 and the PCell has a configuration index of 1, the to-be-applied UL/DL configuration for HARQ timing is 1, the configuration of the PCell. As an example of Case B, when an SCell has a configuration index of 3 and the PCell has a configuration index of 4, the configuration to be utilized for HARQ timing is TDD configuration 3, the UL/DL configuration of the SCell. As an example of Case C, when an SCell has a configuration index of 4 and the PCell has a configuration index of 2, the configuration to be utilized for HARQ timing is 4, the UL/DL configuration of the SCell. Examples of Case D, where the configuration index is 1, include the {PCell, SCell} combinations of {6,2}, {6,5}, {0,2}, {0,4}, {0,5}.

HARQ timing for TDD-FDD joint operation, including for CA and other types of operations (e.g., dual-connectivity operation when there is non-ideal backhaul between two or more CCs), may be based on the timing of one of the TDD or FDD carriers used during the TDD-FDD joint operation. For example, UEs that support both FDD and TDD CA operation may be able to access both legacy FDD carriers as well as legacy TDD single mode carriers. UEs that only support FDD operation may connect with an FDD carrier which is part of the jointly operated FDD/TDD network.

UEs that only support TDD operation may connect with a TDD carrier which is part of the jointly operated FDD/TDD network. Thus, no new TDD DL/UL subframe configurations need be introduced for TDD-FDD joint operation.

However, in some systems, TDD DL/UL subframe configurations can be dynamically adapted based on the actual traffic needs of the carriers. Such adaptation is known as evolved interference management for traffic adaptation (eIMTA). For example, if, during a short duration, a large data burst on a downlink is needed, a TDD DL/UL subframe configuration can be changed from, for example, configuration 1 (which includes six downlink subframes) to configuration 5 (which includes nine downlink subframes) (see Table 1 above). The dynamic adaptation of TDD DL/UL subframe configurations is expected to occur no slower than 640 ms, and it could occur as fast as 10 ms. This adaptation, however, can result in interference in both downlink and uplink carriers when two or more carriers are using different downlink and uplink subframes. The adaptation also causes complexity in DL and UL HARQ timing management. Each of the DL/UL subframe configurations has its own DL/UL HARQ timing, meaning that the timing from a PDSCH to the corresponding ACK/NAK can be different for different TDD DL/UL subframe configurations. The DL/UL HARQ timing may be optimized for each DL/UL subframe configuration (in terms of HARQ operation efficiency). Thus, dynamic switching among the different DL/UL subframe configurations implies that if a current DL/UL HARQ timing is kept, there is a potential that interference could occur and some ACK/NAK transmission opportunities could be missed.

Recognizing this potential for interference, steps may be taken to address this issue. For example, during dynamic indication of TDD DL/UL subframe configurations, an indication of an updated TDD DL/UL subframe configuration can be made using, for example, a DCI transmitted in at least a primary serving cell's PDCCH. The reconfiguration DCI includes at least three bits to explicitly indicate the updated DL/UL subframe configuration. Once an updated DL/UL subframe configuration is indicated, a UE configured with TDD eIMTA can implement a HARQ uplink operation by using the HARQ timing that corresponds to a DL/UL subframe configuration signaled in an SIB1. A downlink reference subframe configuration for the HARQ timing can be determined, for example, from legacy TDD DL/UL subframe configurations 2, 4 and 5.

Nevertheless, when two or more CCs are operating under CA or in dual/multi connectivity, and at least one of the CCs is subject to eIMTA, determination of HARQ timing (and other communication timing) would benefit from additional procedures. Another communication timing that may be determined is how UCI reporting is to be transmitted on, for example, the CC which carries the PUCCH for the UE. While legacy UEs may have only supported a single PUCCH on a primary CC, newer UEs may support PUCCH on both primary and secondary CCs, especially when two or more CCs have non-ideal (i.e., large latency and/or limited bandwidth) backhaul, also referred to as dual-connectivity or multi-flow operation.

Figure 5:
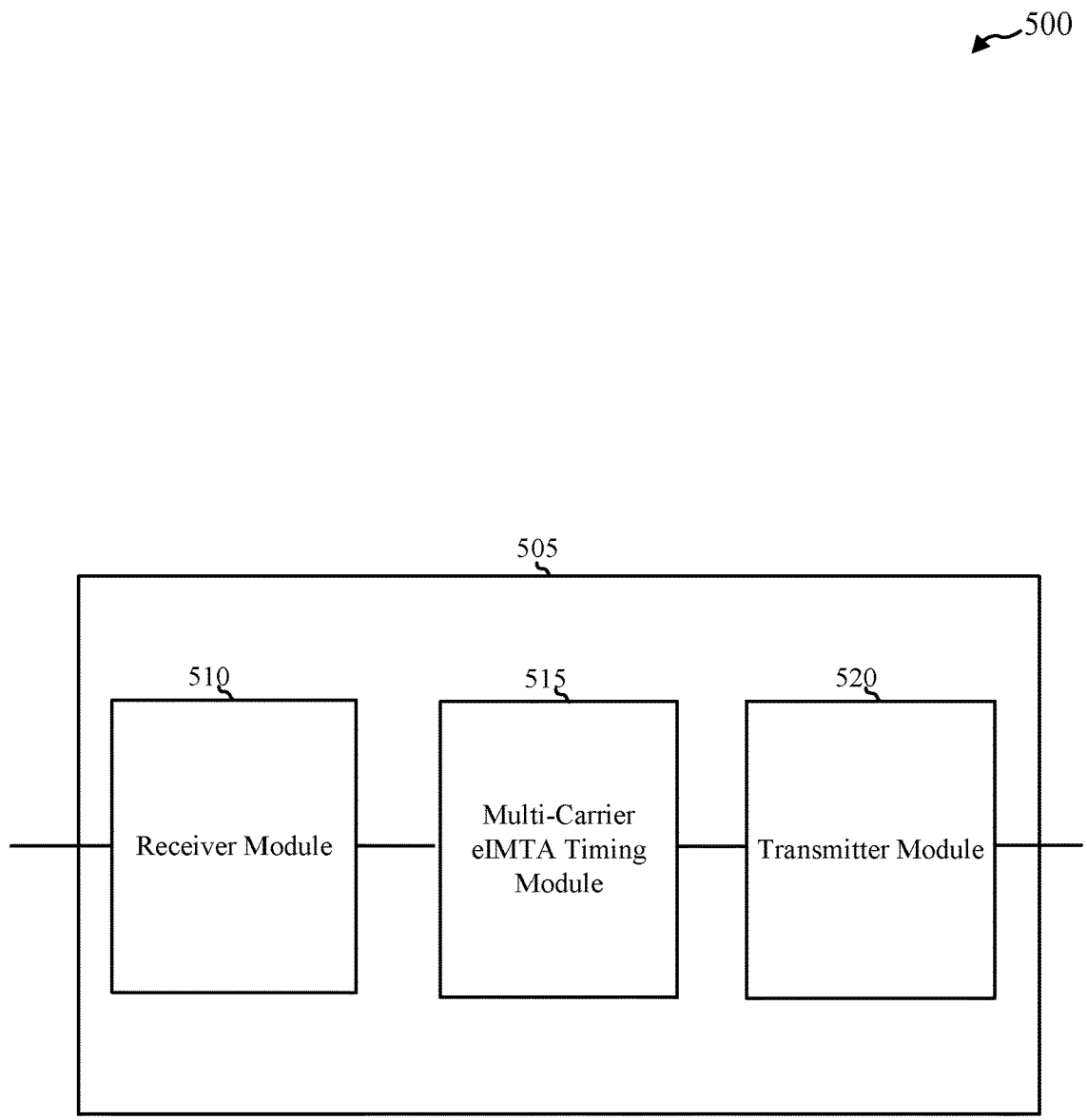
FIG. 5 shows an example of a device configured for multi-carrier communications.

FIG. 5 is an example of a block diagram 500 of an apparatus 505 for use in wireless communication, in accordance with various aspects of the present disclosure. In some examples, the apparatus 505 may be an example of aspects of one or more of the UEs 115 described with reference to FIGS. 1 and/or 3, and may participate in CA operations where at least one of the CCs is enabled for eIMTA. The apparatus 505 may also be a processor. The apparatus 505 may include a receiver module 510, a multi-carrier eIMTA timing module 515, and/or a transmitter module 520. Each of these components may be in communication with each other.

The components of the apparatus 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 510 may include at least one radio frequency (RF) receiver, such as at least one RF receiver operable to receive transmissions over a radio frequency spectrum. In some examples, the radio frequency spectrum may be used for LTE/LTE-A communications, as described, for example, with reference to FIGS. 1, 2, 3 and 4. The receiver module 510 may be used to receive various types of data or control signals (i.e., transmissions) over one or more communication links of a wireless communication system, such as one or more communication links 125, 325 of the wireless communication system 100, 300 described with reference to FIGS. 1 and/or 3, respectively. Examples of the types of data or control signals received by the receiver module 510 include the granting of resources via either PDSCH and PUSCH.

In some examples, the transmitter module 520 may include at least one RF transmitter, such as at least one RF transmitter operable to transmit discovery messages. The transmitter module 520 may be used to transmit various types of data or control signals (i.e., transmissions) over one or more communication links of a wireless communication system, such as one or more communication links 125, 325 of the wireless communication system 100, 300 described with reference to FIGS. 1 and/or 3, respectively. Examples of the types of data or control signals transmitted by the transmitter module 520 include HARQ feedback and/or UCI reporting.

In some examples, the multi-carrier eIMTA timing module 515 may be used to manage the timing of communications when the apparatus 505 is configured for a CA or dual/multi connectivity operation and at least one of the CCs is enabled for eIMTA. Determination of HARQ timing may be managed by the multi-carrier eIMTA timing module 515, and the communications using the at least one of the CCs may be transmitted by the apparatus 505 via the transmitter module 520.

Figure 6:
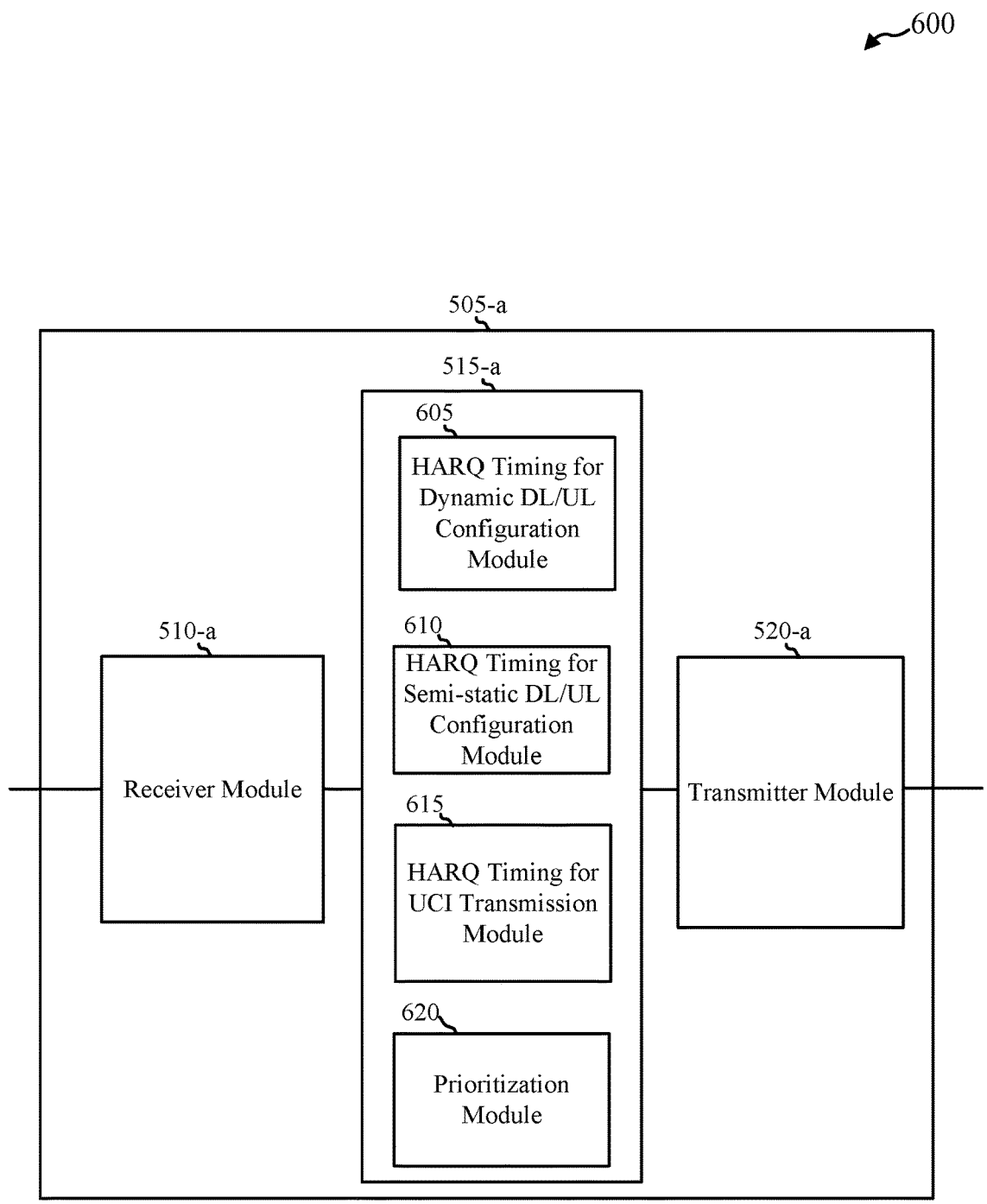
FIG. 6 shows another example of a device configured for multi-carrier communications.

FIG. 6 shows a block diagram 600 that includes apparatus 505-a, which may be an example of one or more aspects of the apparatus 505 (of FIG. 5) for use in wireless communication, in accordance with various aspects of the present disclosure. In some examples, the apparatus 505-a may include a receiver module 510-a and a transmitter module 520-a, which are examples of the receiver module 510 and transmitter module 520 of FIG. 5. In additional examples, the apparatus 505-a may include a multi-carrier eIMTA timing module 515-a, which may be an example of one or more aspects of the multi-carrier eIMTA timing module 515 of FIG. 5. In some examples, the multi-carrier eIMTA timing module 515-a may include a HARQ timing for dynamic DL/UL configuration module 605, a HARQ timing for semi-static DL/UL configuration module 610, a HARQ timing for UCI transmission module 615, and a prioritization module 620. The modules 605, 610, 615, 620 may each be used in aspects of configuring and transmitting communication signals having appropriate timing. While FIG. 6 illustrates a specific example, the functions performed by each of the modules 605, 610, 615, 620 may be combined or implemented in one or more other modules.

The HARQ timing for dynamic DL/UL configuration module 605 and the HARQ timing for semi-static DL/UL configuration module 610 generally manage the timing of HARQ feedback (such as ACK/NAK) based on characteristics of the CCs involved in CA for the apparatus 505-a (such as a UE 115). In one alternative, the HARQ timing of an eIMTA-enabled CC is based on the actual dynamically-configured DL/UL subframe configuration in a frame for the eIMTA-enabled CC. In another alternative, the HARQ timing of an eIMTA-enabled CC may be based on the semi-static DL/UL subframe configuration for the CC. As an example, the DL/UL subframe configuration indicated in an SIB1 message can be used as the semi-static DL/UL subframe configuration for HARQ UL messages, while the semi-static DL/UL subframe configuration for HARQ DL messages may be based on an RRC message indicating a specific configuration (for example, one of configurations 2, 4 or 5). Other semi-static DL/UL subframe configurations may be used.

Thus, HARQ timing for an eIMTA-enabled CC may be based either on dynamically-configured or semi-static DL/UL subframe configurations for the eIMTA-enabled CC. The HARQ timing may further be based on characteristics of other CCs in the CA. For example, HARQ timing may be based on whether CCs in the CA are FDD or TDD. If CCs are of a carrier type of TDD, then HARQ timing may be based on the DL/UL subframe configurations of the various CCs. HARQ timing may also be based on which CC is the primary CC and which CCs are secondary CCs. Whether cross-scheduling or self-scheduling is used may also be a factor. Additionally, HARQ timing may be influenced by whether PUCCH is on the primary CC only, or if PUCCH is transmitted on multiple CCs.

The HARQ timing for dynamic DL/UL configuration module 605 manages the timing of HARQ messages when dynamically-configured DL/UL subframe configurations are used. As an example, the HARQ timing for dynamic DL/UL configuration module 605 may be used when the primary CC is of an FDD carrier type and when the secondary CC is eIMTA-enabled. In this situation, the DL HARQ timing for the secondary CC may be determined based on the dynamic DL/UL subframe configuration of the secondary CC. The determined HARQ timing makes it possible to schedule all DL subframes of the secondary CC without any unnecessary ACK/NAK bundling.

As another example, the HARQ timing for dynamic DL/UL configuration module 605 may be used when the primary CC is of a TDD carrier type, the secondary CC is eIMTA-enabled, and the secondary CC is self-scheduled. In this case, the HARQ timing for the secondary CC may be determined based on the dynamic DL/UL subframe configuration of the secondary CC. This, too, makes it possible to schedule all DL subframes of the secondary CC without any unnecessary ACK/NAK bundling.

In contrast, the HARQ timing for semi-static DL/UL configuration module 610 manages the timing of HARQ messages when semi-static DL/UL subframe configurations are used. As an example, the HARQ timing for semi-static DL/UL configuration module 610 may be used when the primary CC is eIMTA-enabled and when PUCCH is on the primary CC only. In this case, the DL HARQ timing for both the primary CC and the secondary CC may be determined based on a semi-static DL/UL subframe configuration of the primary CC. This HARQ timing determination enables simple operation, but may be at the expense of additional ACK/NAK bundling and/or a limitation on the number of CCs that can possibly be aggregated.

As another example, the HARQ timing for semi-static DL/UL configuration module 610 may be used when the primary CC is of a TDD carrier type, and the secondary CC is eIMTA-enabled, and the secondary CC is cross-carrier scheduled by the primary CC. In this case, the HARQ timing for the secondary CC may be determined based on a semi-static DL/UL subframe configuration. As an example, the HARQ timing for the secondary CC may be determined based on the semi-static DL/UL subframe configuration of the primary CC, which may simplify overall timing.

Similar examples exist for HARQ uplink timing, as may be applied by either the HARQ timing for dynamic DL/UL configuration module 605 or the HARQ timing for semi-static DL/UL configuration module 610.

The HARQ timing for UCI transmission module 615 manages the HARQ timing for transmission of UCI reporting based on characteristics of the CCs involved in CA for the apparatus 505-a (such as a UE 115). In one alternative, the HARQ timing for UCI transmission module 615 determines HARQ timing for a UCI transmission based on whether the CC which carries a PUCCH is eIMTA-enabled. If a PUCCH CC is eIMTA-enabled (regardless of whether the PUCCH CC is for a primary serving cell or a secondary serving cell), the UCI may be transmitted in accordance with one or more of the following options. As a first option, UCI for the PUCCH CC may be only transmitted in fixed UL subframes. The fixed UL subframes may be indicated by the semi-static DL configuration used by the PUCCH CC. The semi-static DL reference configuration of the PUCCH CC may be, for example, one of the three configurations 2, 4 or 5 (see, e.g., Table 1 above). That is, the UCI reporting for the PUCCH CC may only be transmitted in fixed UL subframes based on the UCI reporting configuration (e.g., periodic channel state information (CSI), scheduling request (SR), and/or sounding reference signal (SRS)) and the semi-static DL reference configuration of the PUCCH CC.

As a second option, UCI for the PUCCH CC may be transmitted in both fixed and flexible or dynamic UL subframes. Thus, HARQ timing for the UCI reporting may be based on the UCI reporting configuration (e.g., periodic CSI, SR, and/or SRS) and the dynamically-configured DL/UL subframe configuration of the PUCCH CC.

As additional options, HARQ timing for UCI for other CCs on the PUCCH CC may also apply the above-described options. As a result, HARQ timing on the PUCCH CC for UCI for other CCs may occur using only fixed subframes or may also occur using both fixed and flexible subframes. The HARQ timing of the UCI reporting for the non-PUCCH CCs may be determined based on the semi-static reference configuration for the PUCCH CC.

The HARQ timing for UCI transmission module 615 also determines a HARQ timing for a UCI transmission when a PUCCH CC (regardless of whether the PUCCH CC is for a primary serving cell or a secondary serving cell) is not eIMTA-enabled. As a first option, HARQ timing for the UCI reporting may be determined based on the PUCCH CC structure type (whether the PUCCH CC is FDD or TDD) and, if the PUCCH CC is of a TDD carrier type, the DL/UL subframe configuration of the PUCCH CC. As a second option, HARQ timing for the UCI reporting may be determined based on either the semi-static or dynamic TDD DL/UL subframe configuration of the CC to which the UCI reporting pertains, but transmission of the UCI may be based on the PUCCH CC structure type (whether the PUCCH CC is FDD or TDD) and, if the PUCCH CC is of a TDD carrier type, the DL/UL subframe configuration of the PUCCH CC.

The prioritization module 620 may work with the HARQ timing for UCI transmission module 615 to manage various prioritization issues that may arise between CCs involved in CA. For example, there may be cases when two or more CCs have UCIs due during the same subframe. Only one UCI reporting, however, may be reported during the subframe. This may arise, for example, when periodic CSI from two CCs is to be reported during the same subframe. In the past, prioritization between the two CSI messages was based on, first, the CSI reporting type, and second, the UE-specifically configured serving cell index for each CC (where the lowest UE-specifically configured serving cell index had priority). The prioritization module 620, however, can add additional options for prioritization consideration. These options include whether a CC is eIMTA-enabled and/or whether the UCI reporting is associated with either a fixed or a flexible subframe. For example, the prioritization module 620 may determine that a CSI reporting associated with a flexible subframe for an eIMTA-enabled first CC may have a lower priority than a CSI reporting of the same type and associated with a fixed subframe for an eIMTA-enabled second CC. As another example, the CSI reporting associated with a flexible subframe for an eIMTA-enabled first CC may also have a lower priority than a CSI reporting of the same type for a second CC that is not eIMTA-enabled.

The prioritization module 620 may also provide additional options for power prioritization. In selecting a power allocation for various CCs, the prioritization module 620 may consider whether a CC is eIMTA-enabled and/or whether the UCI for the CC is associated with a fixed or a flexible subframe. For example, the prioritization module 620 may determine that a periodic SRS transmission associated with a flexible subframe for an eIMTA-enabled first CC may have a lower priority than a periodic SRS transmission associated with a fixed subframe for an eIMTA-enabled second CC. As another example, the periodic SRS transmission associated with a flexible subframe for an eIMTA-enabled first CC may also have a lower priority than a periodic SRS transmission for a second CC that is not eIMTA-enabled.

Figure 7:
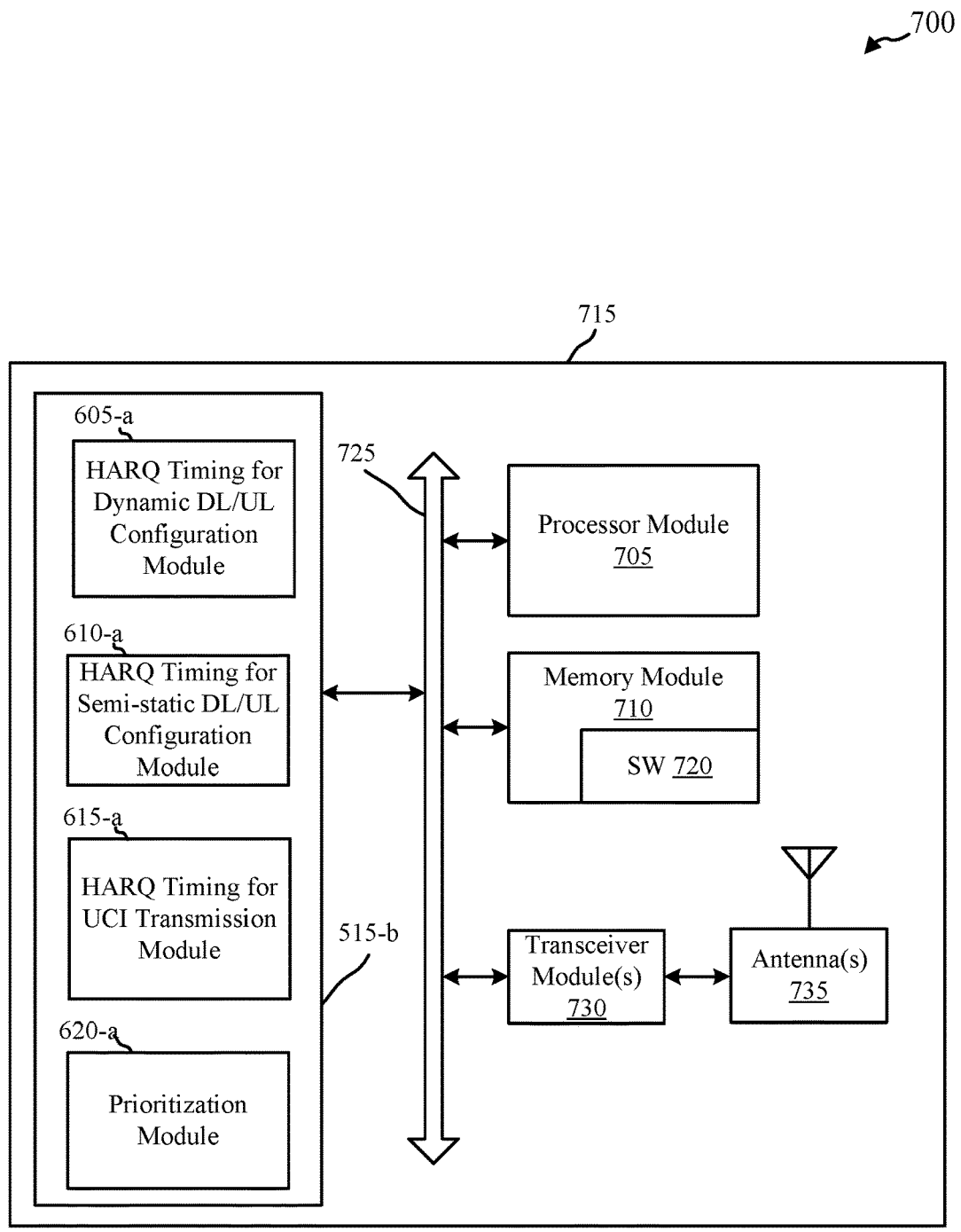
FIG. 7 shows a block diagram of a user equipment configured for multi-carrier communications.

FIG. 7 shows a block diagram 700 of a UE 715 for use in wireless communication, in accordance with various aspects of the present disclosure. The UE 715 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 715 may, in some examples, have an internal power supply (not shown), such as a small battery, to facilitate mobile operation. In some examples, the UE 715 may be an example of one or more aspects of one of the UEs 115 or apparatus 505 described with reference to FIGS. 1, 3, 5, and/or 6. The UE 715 may be configured to implement at least some of the features and functions described with reference to FIGS. 1, 2, 3, 4A, 4B, 5, and/or 6.

The UE 715 may include a processor module 705, a memory module 710, at least one transceiver module (represented by transceiver module(s) 730), at least one antenna (represented by antenna(s) 735), or a multi-carrier eIMTA timing module 515-*b*. Each of these components may be in communication with each other, directly or indirectly, over one or more buses 725.

The memory module 710 may include random access memory (RAM) or read-only memory (ROM). The memory module 710 may store computer-readable, computer-executable software (SW) code 720 containing instructions that are configured to, when executed, cause the processor module 705 to perform various functions described herein for communicating, for example, HARQ and UCI messages. Alternatively, the software code 720 may not be directly executable by the processor module 705 but be configured to cause the UE 715 (e.g., when compiled and executed) to perform various of the functions described herein.

The processor module 705 may include an intelligent hardware device, e.g., a CPU, a microcontroller, an ASIC, etc. The processor module 705 may process information received through the transceiver module(s) 730 or information to be sent to the transceiver module(s) 730 for transmission through the antenna(s) 735. The processor module 705 may handle, alone or in connection with the multi-carrier eIMTA timing module 515-*b*, various aspects of transmitting, receiving and managing the timing of communications such as HARQ and UCI messages.

The transceiver module(s) 730 may include a modem configured to modulate packets and provide the modulated packets to the antenna(s) 735 for transmission, and to demodulate packets received from the antenna(s) 735. The transceiver module(s) 730 may, in some examples, be implemented as one or more transmitter modules and one or more separate receiver modules. The transceiver module(s) 730 may support discovery-related communications. The transceiver module(s) 730 may be configured to communicate bi-directionally, via the antenna(s) 735, with one or more of the base stations 105 described with reference to FIG. 1 or 3. While the UE 715 may include a single antenna, there may be examples in which the UE 715 may include multiple antennas 735.

The multi-carrier eIMTA timing module 515-*b* may be configured to perform or control some or all of the features or functions described with reference to FIG. 1, 2, 3, 4A, 4B, 5 or 6 related to HARQ timing determination. For example, the multi-carrier eIMTA timing module 515-*b* may be configured to support determination of transmission timing of HARQ feedback and HARQ timing for UCI reporting for at least one CC that is subject to eIMTA when multiple CCs are configured for a CA or multi-connectivity operation. In some examples, and by way of example, the multi-carrier eIMTA timing module 515-*b* may be an example of one or more aspects of the multi-carrier eIMTA timing module 515 described with reference to FIG. 5 or 6. The multi-carrier eIMTA timing module 515-*b* may include a HARQ timing for dynamic DL/UL configuration module 605-*a* (which may be an example of the HARQ timing for dynamic DL/UL configuration module 605 of FIG. 6), a HARQ timing for semi-static DL/UL configuration module 610-*a* (which may be an example of the HARQ timing for semi-static DL/UL configuration module 610 of FIG. 6), a HARQ timing for UCI transmission module 615-*a* (which may be an example of the HARQ timing for UCI transmission module 615 of FIG. 6), and a prioritization module 620-*a* (which may be an example of the prioritization module 620 of FIG. 6). The multi-carrier eIMTA timing module 515-*b*, or portions of it, may include a processor, or some or all of the functions of the multi-carrier eIMTA timing module 515-*b* may be performed by the processor module 705 or in connection with the processor module 705. Additionally, the multi-carrier eIMTA timing module 515-b, or portions of it, may include a memory, or some or all of the functions of the multi-carrier eIMTA timing module 515-b may use the memory module 710 or be used in connection with the memory module 710.

Figure 8:
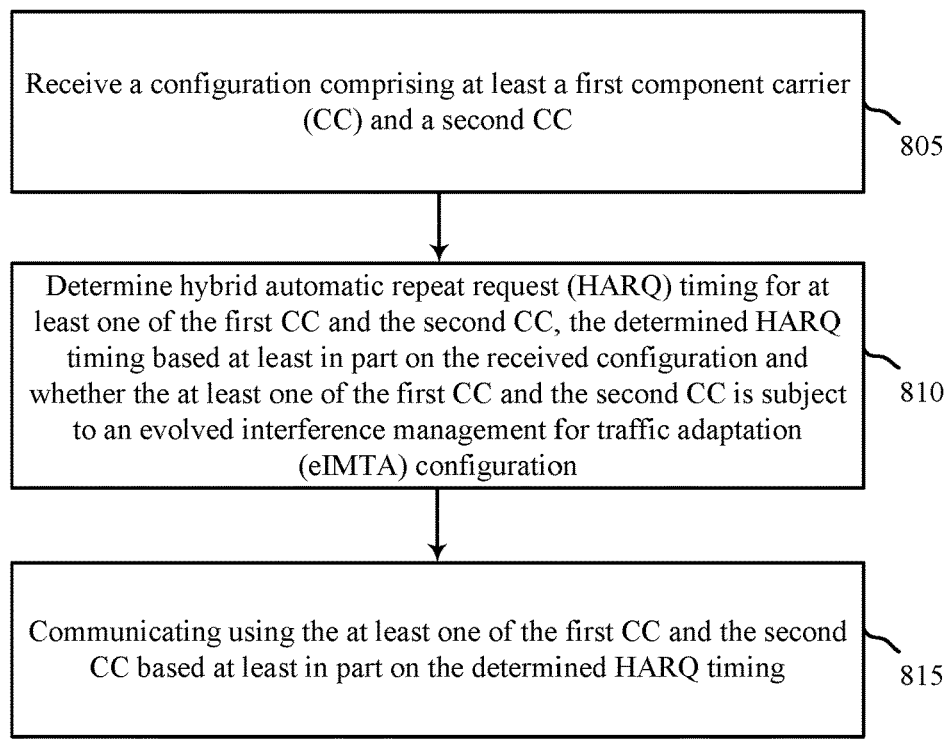
FIG. 8 shows a flow chart of an example of a method for wireless communication.

FIG. 8 is a flow chart illustrating an example of a method 800 for wireless communication, in accordance with various aspects of the present disclosure. For clarity, the method 800 is described below with reference to aspects of one or more of the UEs 115, 715 described with reference to FIG. 1, 3, or 7, or aspects of one or more of the apparatuses 505 described with reference to FIG. 5 or 6. In some examples, a UE such as one of the UEs 115, 715 or an apparatus such as one of the apparatuses 505 may execute one or more sets of codes to control the functional elements of the UE or apparatus to perform the functions described below.

At block 805, the method 800 may include receiving a configuration comprising at least a first CC and a second CC. At block 810, the method 800 may include determining hybrid automatic repeat request (HARQ) timing for at least one of the first CC and the second CC, the determined HARQ timing based at least in part on the received configuration and whether the at least one of the first CC and the second CC is subject to an evolved interference management for traffic adaptation (eIMTA) configuration. As explained above, changes in the CC configuration, as allowed on eIMTA-enabled CCs, may result in interference.

At block 815, the method 800 may include communicating using the at least one of the first CC and the second CC based at least in part on the determined HARQ timing. As explained above with respect to the multi-carrier eIMTA timing module 515 (of FIGS. 5, 6, and/or 7), timing interference can be reduced by determining HARQ timing that considers, among other factors, the characteristics of the CCs in the CA as well as the eIMTA configuration.

The HARQ timing may be determined based on a dynamically-configured DL/UL subframe configuration. Alternatively, the HARQ timing may be determined based on a semi-static DL/UL subframe configuration. The HARQ timing may be applied to communication that uses the CC that is subject to the eIMTA. Additionally, the determined HARQ timing may be applied to communication that includes UCI reporting.

Figure 9:
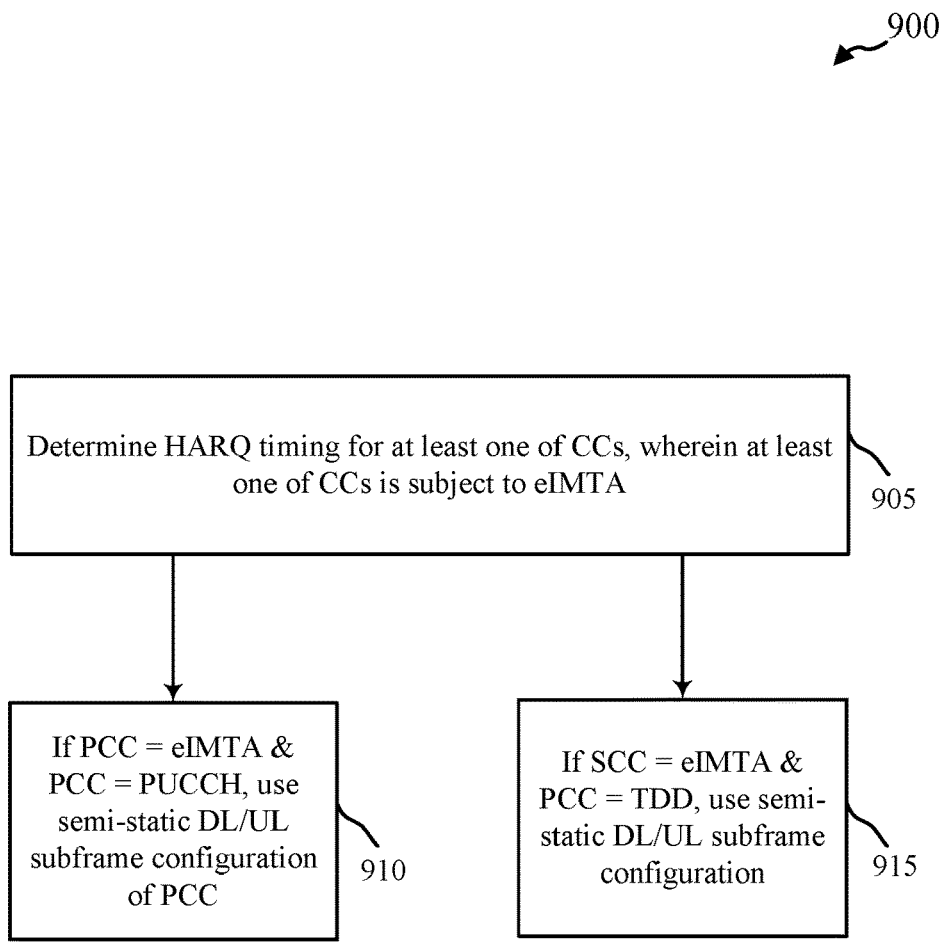
FIG. 9 shows a flow chart of another example of a method for wireless communication.

FIG. 9 is a flow chart illustrating an example of a method 900 for wireless communication, in accordance with various aspects of the present disclosure. For clarity, the method 900 is described below with reference to aspects of one or more of the UEs 115, 715 described with reference to FIG. 1, 3, or 7, or aspects of one or more of the apparatuses 505 described with reference to FIG. 5 or 6. In some examples, a UE such as one of the UEs 115, 715 or an apparatus such as one of the apparatuses 505 may execute one or more sets of codes to control the functional elements of the UE or apparatus to perform the functions described below.

At block 905, the method 900 may include determining HARQ timing for at least one of CCs, wherein at least one of CCs is subject to eIMTA. The CCs may be configured for a carrier aggregation or dual-connectivity operation. The determination of HARQ timing to which method 900 pertains includes a determination that may be based on a semi-static DL/UL subframe configuration. Thus, the functions illustrated in method 900 may pertain to the HARQ timing for semi-static DL/UL configuration module 610 described above with reference to FIGS. 5, 6, and/or 7.

For example, at block 910 in method 900, a HARQ feedback timing may be determined based on the semi-static DL/UL subframe configuration of a primary CC if the following conditions apply: the primary CC is eIMTA-enabled and PUCCH is on the primary CC only. In this case, the DL HARQ timing for both the primary CC and the secondary CCs is based on the semi-static DL/UL subframe configuration of the primary CC.

As another example, at block 915 in method 900, a HARQ feedback timing for a secondary CC may be determined based on a semi-static DL/UL subframe configuration if the following conditions apply: the secondary CC is eIMTA-enabled, and the primary CC is TDD. In this case, the HARQ timing for the secondary CC is based on a semi-static DL/UL subframe configuration. As an example, the HARQ timing for the secondary CC may be based on the semi-static DL/UL subframe configuration of the primary CC.

Figure 10:
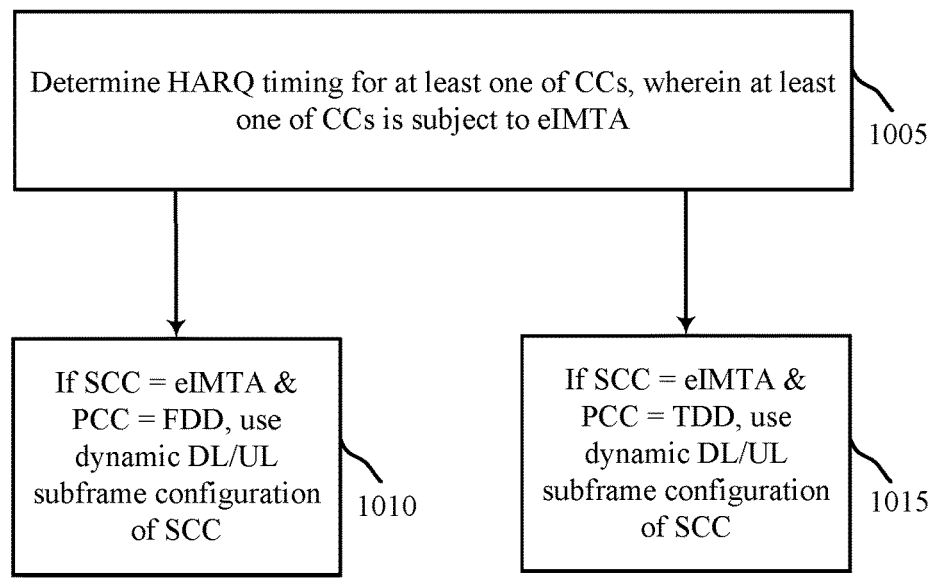
FIG. 10 shows a flow chart of another example of a method for wireless communication.

FIG. 10 is a flow chart illustrating an example of a method 1000 for wireless communication, in accordance with various aspects of the present disclosure. For clarity, the method 1000 is described below with reference to aspects of one or more of the UEs 115, 715 described with reference to FIG. 1, 3, or 7, or aspects of one or more of the apparatuses 505 described with reference to FIG. 5 or 6. In some examples, a UE such as one of the UEs 115, 715 or an apparatus such as one of the apparatuses 505 may execute one or more sets of codes to control the functional elements of the UE or apparatus to perform the functions described below.

At block 1005, the method 1000 may include determining HARQ timing for at least one of CCs, wherein at least one of CCs is subject to eIMTA. The CCs may be configured for a carrier aggregation or dual-connectivity operation. The determination of HARQ timing to which method 1000 pertains includes a determination that may be based on a dynamic DL/UL subframe configuration. Thus, the functions illustrated in method 1000 may pertain to the HARQ timing for dynamic DL/UL configuration module 605 described above with reference to FIGS. 5, 6, and/or 7.

For example, at block 1010 in method 1000, a HARQ feedback timing for a secondary CC may be based on the dynamic DL/UL subframe configuration of the secondary CC if the following conditions apply: the secondary CC is eIMTA-enabled and the primary CC is FDD. In this case, the DL HARQ timing for the secondary CCs is based on the dynamic DL/UL subframe configuration of the secondary CC.

As another example, at block 1015 in method 1000, a HARQ feedback timing for a secondary CC may be based on the dynamic DL/UL subframe configuration of the secondary CC if the following conditions apply: the secondary CC is eIMTA-enabled, and the primary CC is TDD. In this case, the HARQ timing for the secondary CC is based on the dynamic DL/UL subframe configuration of the secondary CC.

Figure 11:
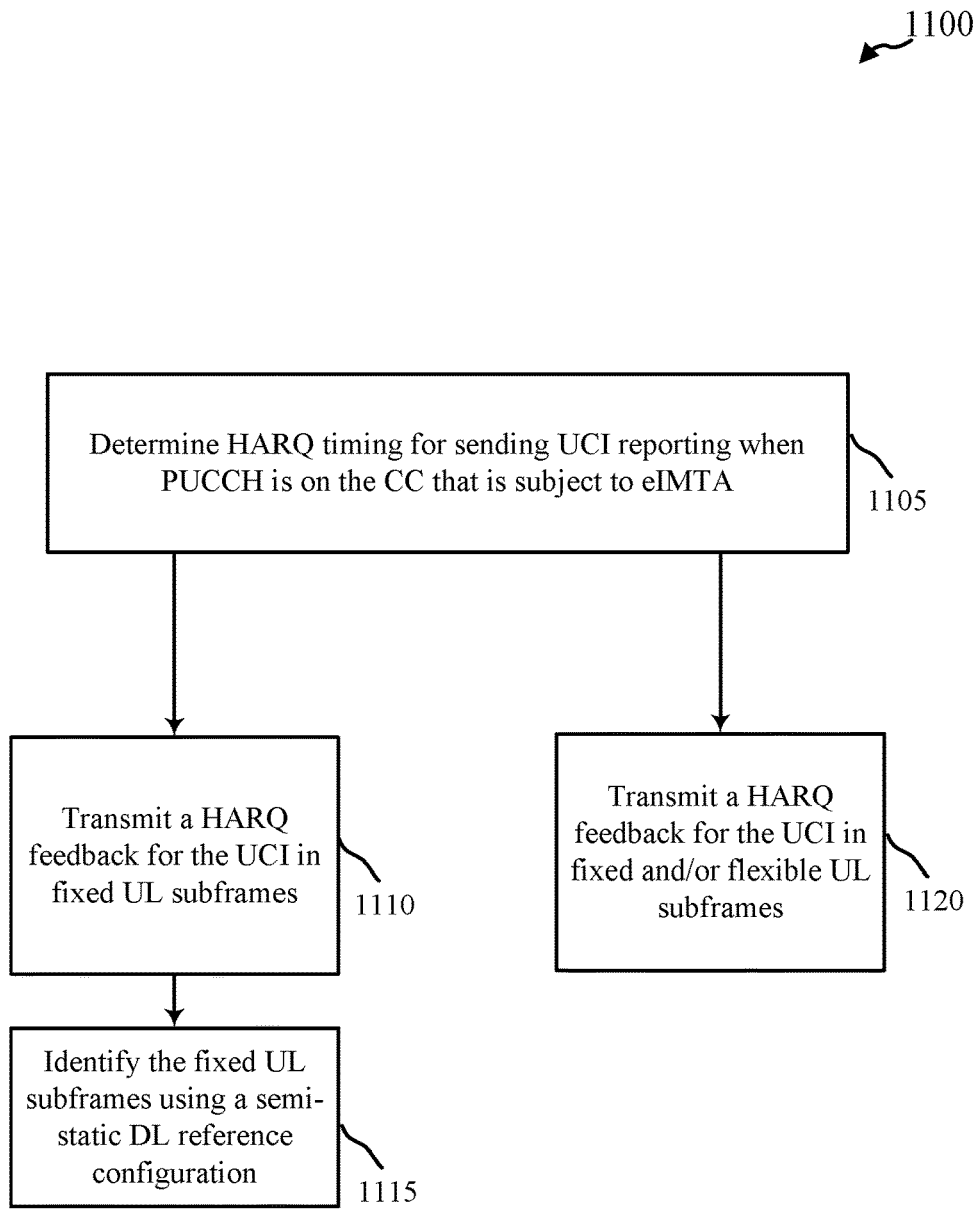
FIG. 11 shows a flow chart of another example of a method for wireless communication.

FIG. 11 is a flow chart illustrating an example of a method 1100 for wireless communication, in accordance with various aspects of the present disclosure. For clarity, the method 1100 is described below with reference to aspects of one or more of the UEs 115, 715 described with reference to FIG. 1, 3, or 7, or aspects of one or more of the apparatuses 505 described with reference to FIG. 5 or 6. In some examples, a UE such as one of the UEs 115, 715 or an apparatus such as one of the apparatuses 505 may execute one or more sets of codes to control the functional elements of the UE or apparatus to perform the functions described below.

At block 1105, the method 1100 may include determining HARQ timing for sending UCI reporting when PUCCH is on the CC that is subject to eIMTA. The determination of HARQ timing to which method 1100 pertains include HARQ timing described with reference to the HARQ timing for UCI transmission module 615 described above with reference to FIGS. 5, 6, and/or 7. Method 1100 and block 1105 are particularly focused on HARQ timing for UCI reporting where the PUCCH CC is eIMTA-enabled.

For example, at block 1110 in method 1100, a HARQ feedback for a UCI reporting for the PUCCH CC may be transmitted using fixed UL subframes. At block 1115, the fixed UL subframes are identified by using a semi-static DL/UL subframe configuration for the PUCCH CC. As an alternative, at block 1120, a HARQ feedback for the UCI reporting for the PUCCH CC may be transmitted using both fixed and flexible UL subframes. In this case, the flexible subframes may be based on the dynamic DL/UL subframe configuration of the PUCCH CC.

Blocks 1105, 1110, 1115 and 1120 of method 1100 may also apply to a determination of HARQ timing for UCI reporting for other CCs whose UCI reporting is transmitted on the PUCCH CC that is subject to eIMTA. In these instances, the same options may apply, though the periodic configuration of these other CCs may be based on the semi-static DL/UL configuration for the PUCCH CC.

Figure 12:
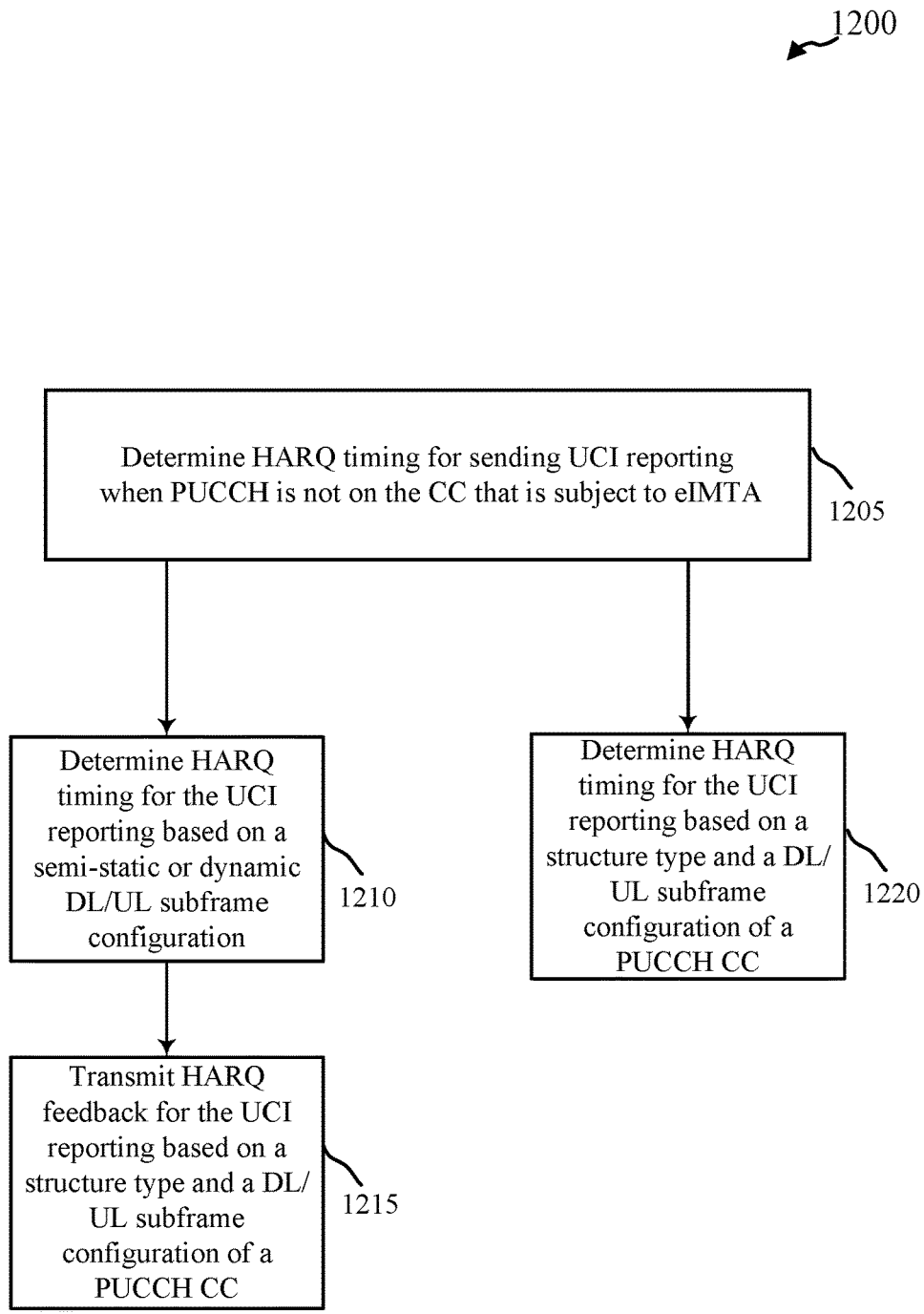
FIG. 12 shows a flow chart of another example of a method for wireless communication.

FIG. 12 is a flow chart illustrating an example of a method 1200 for wireless communication, in accordance with various aspects of the present disclosure. For clarity, the method 1200 is described below with reference to aspects of one or more of the UEs 115, 715 described with reference to FIG. 1, 3, or 7, or aspects of one or more of the apparatuses 505 described with reference to FIG. 5 or 6. In some examples, a UE such as one of the UEs 115, 715 or an apparatus such as one of the apparatuses 505 may execute one or more sets of codes to control the functional elements of the UE or apparatus to perform the functions described below.

At block 1205, the method 1200 may include determining HARQ timing for sending UCI reporting when PUCCH is not on an eIMTA-enabled CC. The HARQ timing to which method 1200 pertains includes HARQ timing described with reference to the HARQ timing for the UCI transmission module 615 described above with reference to FIGS. 5, 6, and/or 7. Method 1200 and block 1205 are particularly focused on HARQ timing for UCI reporting where the PUCCH CC is not eIMTA-enabled.

For example, at block 1220 in method 1200, a UCI reporting for a non-PUCCH CC (i.e., a UCI reporting that is for a CC other than the PUCCH CC but that is to be transmitted on the PUCCH CC) may be configured and transmitted based on the PUCCH CC structure type and/or its DL/UL subframe configuration. If the PUCCH CC structure type is TDD, then its DL/UL subframe configuration may be used as the basis for the determination of the HARQ timing for the UCI reporting. As an alternative, at block 1210, a HARQ timing for a UCI reporting for a non-PUCCH CC may be determined based on the semi-static or dynamic TDD DL/UL subframe configuration of the non-PUCCH CC. At block 1215, a HARQ feedback for the UCI may be transmitted based on the PUCCH CC structure type and/or DL/UL subframe configuration. If the PUCCH CC structure type is TDD, then its DL/UL subframe configuration may be used as the basis for the determination of the HARQ timing for the UCI reporting.

Figure 13:
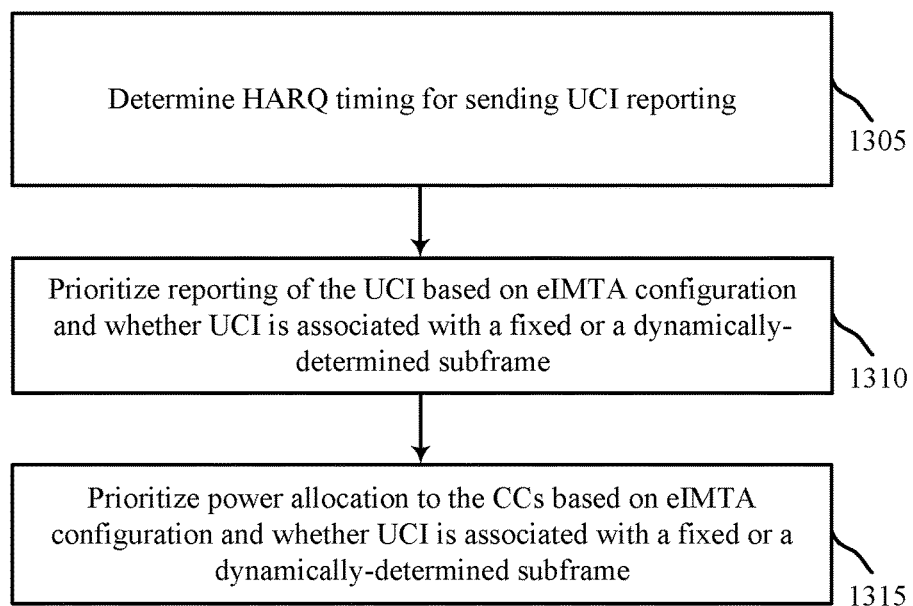
FIG. 13 shows a flow chart of another example of a method for wireless communication.

FIG. 13 is a flow chart illustrating an example of a method 1300 for wireless communication, in accordance with various aspects of the present disclosure. For clarity, the method 1300 is described below with reference to aspects of one or more of the UEs 115, 715 described with reference to FIG. 1, 3, or 7, or aspects of one or more of the apparatuses 505 described with reference to FIG. 5 or 6. In some examples, a UE such as one of the UEs 115, 715 or an apparatus such as one of the apparatuses 505 may execute one or more sets of codes to control the functional elements of the UE or apparatus to perform the functions described below.

At block 1305, the method 1300 may include determine HARQ timing for sending UCI reporting. The HARQ timing to which method 1300 pertains includes HARQ timing described with reference to the HARQ timing for UCI transmission module 615 and the prioritization module 620 described above with reference to FIGS. 5, 6, and/or 7. Method 1300 and block 1305 are particularly focused on prioritization decisions that take eIMTA configuration and fixed or flexible DL/UL subframe configuration into account.

At block 1310, the method 1300 may include prioritizing the transmission of UCI reporting based on whether the CC to which the UCI reporting pertains is eIMTA-enabled. The prioritizing of the reporting of the UCI may also be based on whether the UCI reporting is associated with a fixed or a dynamically-determined subframe configuration. For example, at block 1310, method 1300 may determine that a CSI reporting associated with a flexible subframe for an eIMTA-enabled first CC may have a lower priority than a CSI reporting of the same type and associated with a fixed subframe for an eIMTA-enabled second CC. As another example, the CSI reporting associated with a flexible subframe for an eIMTA-enabled first CC may also have a lower priority than a CSI reporting of the same type for a second CC that is not eIMTA-enabled.

At block 1315, the method 1300 may include prioritizing the allocation of power to CCs based on whether the CCs are eIMTA-enabled. The power prioritizing may also be based on whether the UCI for each CC is associated with a fixed or a dynamically-determined subframe configuration. For example, at block 1315, method 1300 may determine that a periodic SRS transmission associated with a flexible subframe for an eIMTA-enabled first CC may have a lower priority than a periodic SRS transmission associated with a fixed subframe for an eIMTA-enabled second CC. As another example, the periodic SRS transmission associated with a flexible subframe for an eIMTA-enabled first CC may also have a lower priority than a periodic SRS transmission for a second CC that is not eIMTA-enabled.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS. LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
receiving a configuration, comprising at least a first component carrier (CC) and a second CC, at least one of the first CC or the second CC being enabled for evolved interference management for traffic adaptation (eIMTA);
determining hybrid automatic repeat request (HARQ) timing for at least one of the first CC or the second CC, the determined HARQ timing based at least in part on: the received configuration, the at least one of the first CC or the second CC being enabled for eIMTA, a cross-carrier scheduling configuration of the first CC and the second CC, and indexing a table using a first subframe configuration index corresponding to the first CC and a second subframe configuration index corresponding to the second CC; and
communicating using the at least one of the first CC find or the second CC based at least in part on the determined HARQ timing.

2. The method of claim 1, wherein the determined HARQ timing is based on a dynamically configured downlink/uplink (DL/UL) subframe configuration of the at least one CC that is enabled for eIMTA.

3. The method of claim 1, wherein the determined HARQ timing is based on a semi-static downlink/uplink (DL/UL) subframe configuration of the at least one CC that is enabled for eIMTA.

4. The method of claim 3, wherein a UL HARQ timing is determined based on a subframe configuration indicated in a broadcast system information block (SIB) message for the at least one CC that is enabled for eIMTA.

5. The method of claim 3, wherein a DL HARQ timing is determined based on a subframe configuration indicated by a radio resource control (RRC) message for the at least one CC that is enabled for eIMTA.

6. The method of claim 1, wherein the determined HARQ timing comprises at least one of HARQ acknowledgement (ACK) timing or HARQ scheduling timing.

7. The method of claim 1, wherein the determined HARQ timing is further based, at least in part, on at least one of the following:
whether the first CC or the second CC has a time-domain duplex (TDD) or a frequency-domain duplex (FDD) carrier type, designation of the first CC or the second CC as primary or secondary CCs, a number of physical uplink control channels (PUCCHs), or whether the first CC and the second CC are configured for a carrier aggregation operation or a dual-connectivity operation.

8. The method of claim 7, wherein if the at least one CC that is enabled for eIMTA is the primary CC and the number of PUCCHs is one, with the one PUCCH being on the primary CC, then the HARQ timing for both the primary CC and the secondary CC is based on a semi-static DL/UL subframe configuration of the primary CC.

9. The method of claim 7, wherein if the at least one CC that is enabled for eIMTA is the secondary CC and the primary CC is of a TDD carrier type, then the HARQ timing for both the primary CC and the secondary CC is based on a semi-static DL/UL subframe configuration of the secondary CC.

10. The method of claim 7, wherein if the at least one CC that is enabled for eIMTA is the secondary CC and the primary CC is of an FDD carrier type, then the HARQ timing for the secondary CC is based on a dynamic DL/UL subframe configuration of the secondary CC.

11. The method of claim 1, wherein determining the HARQ timing comprises determining HARQ timing for uplink control information (UCI) reporting and the HARQ timing indicates one or more subframes for sending the UCI reporting.

12. The method of claim 11, further comprising:
prioritizing sending of the UCI based on whether the UCI reporting is for the at least one CC that is enabled for eIMTA or whether the UCI reporting is associated with a fixed or a dynamically-determined subframe.

13. The method of claim 11, wherein determining the HARQ timing for sending the UCI reporting is based, at least in part, on whether the at least one CC that is enabled for eIMTA carries a physical uplink control channel (PUCCH).

14. The method of claim 13, wherein if the at least one CC that is enabled for eIMTA carries the PUCCH, then the HARQ timing for sending UCI reporting on the at least one CC that is enabled for eIMTA uses dynamically-determined uplink subframes.

15. The method of claim 13, wherein if the at least one CC that is enabled for eIMTA does not carry the PUCCH, then the HARQ timing for sending UCI reporting on the CC which carries the PUCCH uses fixed uplink subframes.

16. The method of claim 1, wherein the first CC and the second CC are configured for a carrier aggregation (CA) operation or are configured for a dual-connectivity operation.

17. An apparatus for wireless communication, comprising:
means for receiving a configuration comprising at least a first component carrier (CC) and a second CC, at least one of the first CC or the second CC being enabled for evolved interference management for traffic adaptation (eIMTA);
means for determining hybrid automatic repeat request (HARQ) timing for at least one of the first CC or the second CC, the determined HARQ timing based at least in part on: the received configuration, the at least one of the first CC or the second CC being enabled for eIMTA, a cross-carrier scheduling configuration of the first CC and the second CC, and indexing a table using a first subframe configuration index corresponding to the first CC and a second subframe configuration index corresponding to the second CC; and
means for communicating using the at least one of the first CC or the second CC based at least in part on the determined HARQ timing.

18. An apparatus for wireless communication, comprising:
at least one processor;
a memory coupled to the at least one processor, the memory storing instructions executable by the at least one processor to cause the apparatus to:
receive a configuration comprising at least a first component carrier (CC) and a second CC, at least one of the first CC or the second CC being enabled for evolved interference management for traffic adaptation (eIMTA);
determine hybrid automatic repeat request (HARQ) timing for at least one of the first CC or the second CC, the determined HARQ timing based at least in part on: the received configuration, the at least one of the first CC or the second CC being enabled for eIMTA, a cross-carrier scheduling configuration of the first CC and the second CC, and indexing a table using a first subframe configuration index corresponding to the first CC and a second subframe configuration index corresponding to the second CC; and
communicate using the at least one of the first CC or the second CC based at least in part on the determined HARQ timing.

19. The apparatus of claim 18, wherein
the determined HARQ timing is based on a dynamically configured downlink/uplink (DL/UL) subframe configuration of the at least one CC that is enabled for eIMTA.

20. The apparatus of claim 18, wherein
the determined HARQ timing based on a semi-static downlink/uplink (DL/UL) subframe configuration of the at least one CC that is enabled for eIMTA.

21. The apparatus of claim 20, wherein a UL HARQ timing is determined based on a subframe configuration indicated in a broadcast system information block (SIB) message for the at least one CC that is enabled for eIMTA.

22. The apparatus of claim 20, wherein a DL HARQ timing is determined based on a subframe configuration indicated by a radio resource control (RRC) message for the at least one CC that is enabled for eIMTA.

23. The apparatus of claim 18, wherein the determined HARQ timing comprises at least one of HARQ acknowledgement (ACK) timing or HARQ scheduling timing.

24. The apparatus of claim 18, wherein the determined HARQ timing is further based, at least in part, on at least one of the following:

whether the first CC or the second CC has a time-domain duplex (TDD) or a frequency-domain duplex (FDD) carrier type, designation of the first CC or the second CC as primary or secondary CCs, a number of physical uplink control channels (PUCCHs), or whether the first CC and the second CC are configured for a carrier aggregation operation or a dual-connectivity operation.

25. The apparatus of claim 18, wherein determining the HARQ timing comprises determining HARQ timing for uplink control information (UCI) reporting and the HARQ timing indicates one or more subframes for sending the UCI reporting.

26. The apparatus of claim 25, wherein the instructions are further executable by the at least one processor to cause the apparatus to:

prioritize sending of the UCI based on whether the UCI reporting is for the at least one CC that is enabled for eIMTA or whether the UCI reporting is associated with a fixed or a dynamically-determined subframe.

27. The apparatus of claim 18, wherein the first CC and the second CC are configured for a carrier aggregation (CA) operation or are configured for a dual-connectivity operation.

28. A non-transitory computer-readable medium having non-transitory program code recorded thereon, the non-transitory program code executable by at least one processor to cause an apparatus to:

receive a configuration comprising at least a first component carrier (CC) and a second CC, at least one of the first CC or the second CC being enabled for evolved interference management for traffic adaptation (eIMTA);

determine hybrid automatic repeat request (HARQ) timing for at least one of the first CC or the second CC, the determined HARQ timing based at least in part on: the received configuration, the at least one of the first CC or the second CC being enabled for eIMTA, a cross-carrier scheduling configuration of the first CC and the second CC, and indexing a table using a first subframe configuration index corresponding to the first CC and a second subframe configuration index corresponding to the second CC; and communicate using the at least one of the first CC or the second CC based at least in part on the determined HARQ timing.

* * * * *

UNITED STATES PATENT AND TRADEMARK OFFICE
CERTIFICATE OF CORRECTION

PATENT NO. : 10,778,376 B2  
APPLICATION NO. : 16/215615  
DATED : September 15, 2020  
INVENTOR(S) : Chen et al.

Page 1 of 1

It is certified that error appears in the above-identified patent and that said Letters Patent is hereby corrected as shown below:

In the Claims

Claim 1, Column 28, Lines 61-63, should read:
"communicating using the at least one of the first CC or the second CC based at least in part on the determine HARQ timing."

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*